(12) United States Patent
Nagahama et al.

(10) Patent No.: US 8,325,418 B2
(45) Date of Patent: Dec. 4, 2012

(54) OPTICAL FILM, ITS MANUFACTURING METHOD, ANTI-GLARE POLARIZER USING THE SAME, AND DISPLAY APPARATUS

(75) Inventors: Tsutomu Nagahama, Miyagi (JP); Yumi Haga, Miyagi (JP); Hitoshi Watanabe, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 12/520,946

(22) PCT Filed: Jun. 20, 2008

(86) PCT No.: PCT/JP2008/061680
§ 371 (c)(1),
(2), (4) Date: Jun. 23, 2009

(87) PCT Pub. No.: WO2009/001911
PCT Pub. Date: Dec. 31, 2008

(65) Prior Publication Data
US 2009/0310219 A1    Dec. 17, 2009

(30) Foreign Application Priority Data
Jun. 28, 2007  (JP) ................................ 2007-170563

(51) Int. Cl.
*G02B 5/30* (2006.01)
(52) U.S. Cl. .............. 359/488.01; 359/493.01; 359/599; 359/601; 359/613
(58) Field of Classification Search .......... 359/486.01–486.03, 488.01, 493.01, 359/601, 609, 613, 900, 599; 349/64, 96, 349/112
See application file for complete search history.

(56) References Cited

U.S. PATENT DOCUMENTS 6,343,865 B1 * 2/2002 Suzuki .......................... 359/601
7,505,104 B2 * 3/2009 Watanabe et al. ............. 349/137
(Continued)

FOREIGN PATENT DOCUMENTS
EP    1962111    8/2008
(Continued)

OTHER PUBLICATIONS

EP Search Report for corresponding European Patent Application No. 08777645 dated Aug. 30, 2011.
(Continued)

*Primary Examiner* — Frank Font
(74) *Attorney, Agent, or Firm* — K&L Gates LLP

(57) ABSTRACT

An anti-glare film is provided and includes micro concave/convex portions on a surface. An average interval between the micro concave and convex portions is equal to 300 μm or less. A differentiation with respect to angle $d\{Log(I(\alpha))\}/d\alpha$ of a logarithm intensity of reflection $Log(I(\alpha))$ in a direction of a deviation angle α from a direction of specular reflection has an extreme value. A differentiation $d\{Log(P(\beta))\}/d\beta$ of a histogram $P(\beta)$ to an inclination angle β of the micro concave/convex portions has an extreme value. In the anti-glare film 1, a value $C(2.0)$ of transmitted image clarity measured by using an optical comb of a comb width of 2 mm in accordance with JIS-K7105 is equal to 30% or more, and a ratio $C(0.125)/C(2.0)$ of the value $C(2.0)$ measured by using the optical comb of the comb width of 2 mm and a value $C(0.125)$ measured by using an optical comb having a comb width of 0.125 mm is equal to 0.1 or more.

26 Claims, 19 Drawing Sheets

U.S. PATENT DOCUMENTS

| | | |
|---|---|---|
| 7,848,021 B2 * | 12/2010 | Asakura et al. ............... 359/599 |
| 2002/0012169 A1 | 1/2002 | Kashima |
| 2002/0034013 A1 | 3/2002 | Nakamura et al. |
| 2002/0142133 A1 | 10/2002 | Matsunaga et al. |
| 2005/0063062 A1 | 3/2005 | Ito et al. |
| 2008/0137206 A1 * | 6/2008 | Nakamura et al. ............ 359/601 |

FOREIGN PATENT DOCUMENTS

| | | |
|---|---|---|
| JP | 91-93333 | 7/1997 |
| JP | 2003-107211 | 4/2003 |
| JP | 2003-121617 | 4/2003 |
| JP | 11-305010 | 3/2004 |
| JP | 2000-180611 | 4/2004 |
| JP | 2000-338309 | 6/2005 |
| JP | 2007-079027 | 3/2007 |
| WO | 2006090879 | 8/2006 |

OTHER PUBLICATIONS

International Search Report dated Oct. 7, 2008, for corresponding Patent Application PCT/JP2008/061680.

* cited by examiner

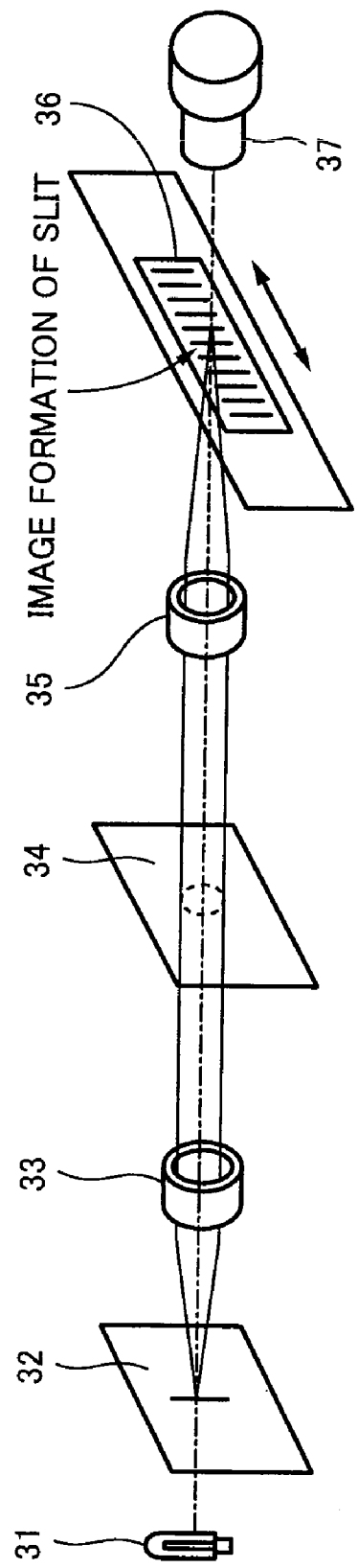

OPTICAL FILM, ITS MANUFACTURING METHOD, ANTI-GLARE POLARIZER USING THE SAME, AND DISPLAY APPARATUS

CROSS REFERENCE TO RELATED APPLICATIONS

The present application is a National Stage of International Application No. PCT/JP2008/061680 filed on Jun. 20, 2008 and which claims priority to Japanese Patent Application No. 2007-170563 filed on Jun. 28, 2007, the entire contents of which are being incorporated herein by reference.

BACKGROUND

Hitherto, in the various display apparatuses such as liquid crystal display, plasma display, and CRT display, if external light of a fluorescent lamp or the like is reflected onto the surface, visibility is remarkably deteriorated. Therefore, there is used a method whereby a reflectance is decreased by forming an optical multilayer film or a film of a low refractive index onto the surface of the display apparatus or the external light is diffused and reflected by forming an optical film such as an anti-glare film having micro concave/convex portions on the surface, thereby blurring a reflection image.

However, there is such a problem that if the optical multilayer film is used, manufacturing costs increase, an anti-glare property is insufficient, and even if the manufacturing costs are suppressed by using the low refractive index film, the reflectance is relatively high, so that the user is aware of the reflection.

On the other hand, the method whereby the anti-glare film having the micro concave/convex portions on the surface is used and the reflection image is blurred by the diffuse reflection is widely used because it is reasonable and high productivity is obtained.

A construction of a conventional anti-glare film 101 is shown in FIG. 1. The anti-glare film 101 has: a substrate 111; and an anti-glare layer 112 formed on the substrate 111. The anti-glare layer 112 is formed by a resin containing fine particles 113 made of irregular silica or resin beads. By projecting the fine particles 113 from the surface of the anti-glare layer 112, micro concave/convex portions are formed on the surface. The anti-glare film 101 is formed by coating the substrate 111 with a coating material containing the fine particles 113, a resin, a solvent, and the like and hardening the coating material. According to the anti-glare film 101 having the construction mentioned above, since light which enters the anti-glare layer 112 is scattered by the micro concave/convex portions on the surface of the anti-glare layer 112, a reflection due to the surface reflection is reduced.

However, since the micro concave/convex portions on the surface of the anti-glare film 101 are formed by: the fine particles 113 projected from the surface; and a binder portion in which an interval between the projections of the fine particles 113 is formed by a continuous slope, although the film has a high anti-glare property, there is such a problem that the light which passes through the anti-glare layer 112 in the vertical direction is also strong scattered and transmitted image clarity deteriorates.

Therefore, as shown in FIG. 2, such a technique that a filling rate of the fine particles 13 in the anti-glare layer 112 is reduced and a cycle of the concave/convex portions on the surface of the anti-glare layer 112 is extended, thereby suppressing the deterioration in transmitted image clarity is considered. However, there is such a problem that if it is intended to realize the smooth concave/convex portions by extending the cycle of the concave/convex portions on the surface of the anti-glare layer 112 as mentioned above, flat portions are formed in the binder portions between the projections of the fine particles 113, so that the anti-glare property deteriorates.

Since there is a relation of trade-off between the anti-glare property and the transmitted image clarity as mentioned above, an anti-glare film in which the deterioration in transmitted image clarity is suppressed while having the anti-glare property is demanded. Particularly, the realization of the high fineness of the image display apparatus has been progressed in recent years. If the conventional anti-glare film is used, since problems such as generation of micro luminance variation which is what is called a glare (scintillation), reduction in contrast of a fine video image, and the like occur, an anti-glare process which can cope with the realization of high fineness and can improve those problems is demanded and various examinations are being progressed.

For example, techniques for improving the glare and clarity while keeping the anti-glare property by adjusting an internal scattering have been disclosed in the Official Gazettes of Japanese Patent Nos. 3507719 and 3515401. A technique for improving the glare by setting an average interval between the concave and convex portions of the anti-glare layer to be sufficiently narrower than a pixel size of the image display apparatus has been disclosed in the Official Gazettes of Japanese Patent No. 3661491.

However, since there is a relation of trade-off between the anti-glare property and the transmitted image clarity which exerts an influence on a contrast of the fine drawing image as mentioned above, it is difficult to improve the transmitted image clarity while maintaining the anti-glare property. According to the techniques disclosed in foregoing Patent Documents 1 to 3, although the anti-glare property and the transmitted image clarity can be improved to a certain extent, a degree of the improvement is insufficient and it is demanded to further improve both of those characteristics.

An object of the embodiment is to provide an optical film having an anti-glare property and having excellent transmitted image clarity and to provide a manufacturing method of such a film, an anti-glare polarizer using such a film, and a display apparatus using such a film.

SUMMARY

The present disclosure relates to an optical film, a method of manufacturing such a film, an anti-glare polarizer using such a film, and a display apparatus using such a film. More particularly, the present disclosure relates to an optical film which is used for various display apparatuses such as liquid crystal display, plasma display, rear projection type display, electroluminescence display, CRT (Cathode Ray Tube) display, and touch panel display and relates to a method of manufacturing such a film, an anti-glare polarizer using such a film, and a display apparatus using such a film.

In an embodiment, by mixing almost flat portions and portions having inclination angles on the surface of an optical film and controlling diffusion reflecting characteristics, the transmitted image clarity can be improved while maintaining an anti-glare property.

To solve the foregoing problems, according to the first embodiment, there is provided an optical film, wherein
micro concave/convex portions are formed on a surface,
an average interval between the micro concave and convex portions is equal to 300 μm or less, and
a differentiation with respect to angle $d\{Log(I(\alpha))\}/d\alpha$ of a logarithm intensity of reflection $Log(I(\alpha))$ in a direction of a deviation angle α from a direction of specular reflection has an extreme value.

According to the second embodiment, there is provided an optical film, wherein
micro concave/convex portions are formed on a surface,
an average interval between the micro concave and convex portions is equal to 300 μm or less, and
a differentiation $d\{P(\beta)\}/d\beta$ of a histogram $P(\beta)$ to an inclination angle β of the micro concave/convex portions has an extreme value.

According to the third embodiment, there is provided an optical film, wherein
micro concave/convex portions are formed on a surface,
an average interval between the micro concave and convex portions is equal to 300 μm or less,
a value C(2.0) of transmitted image clarity measured by using an optical comb having a comb width of 2 mm in accordance with JIS-K7105 is equal to 30% or more, and
a ratio C(0.125)/C(2.0) of the value C(2.0) measured by using the optical comb having the comb width of 2 mm and a value C(0.125) measured by using an optical comb having a comb width of 0.125 mm is equal to 0.1 or more.

According to the fourth embodiment, there is provided a manufacturing method of an optical film having micro concave/convex portions on a surface, comprising
a step of forming the micro concave/convex portions by a shape transfer method, a sand blasting method, or a method of coating with a coating material containing a resin and fine particles,
wherein an average interval between the micro concave and convex portions is equal to 300 μm or less, and
a differentiation with respect to angle $d\{Log(I(\alpha))\}/d\alpha$ of a logarithm intensity of reflection $Log(I(\alpha))$ in a direction of a deviation angle α from a direction of specular reflection has an extreme value.

According to the fifth embodiment, there is provided a manufacturing method of an optical film having micro concave/convex portions on a surface, comprising
a step of forming the micro concave/convex portions by a shape transfer method, a sand blasting method, or a method of coating the surface with a resin containing fine particles,
wherein an average interval between the micro concave and convex portions is equal to 300 μm or less, and
a differentiation $d\{P(\beta)\}/d\beta$ of a histogram (β) to an inclination angle β of the micro concave/convex portions has an extreme value.

According to the sixth embodiment, there is provided a manufacturing method of an optical film having micro concave/convex portions on a surface, comprising
a step of forming the micro concave/convex portions by a shape transfer method, a sand blasting method, or a method of coating the surface with a resin containing fine particles,
wherein an average interval between the micro concave and convex portions is equal to 300 μm or less, and
a value C(2.0) of transmitted image clarity measured by using an optical comb having a comb width of 2 mm in accordance with JIS-K7105 is equal to 30% or more, and
a ratio C(0.125)/C(2.0) of the value C(2.0) measured by using the optical comb having the comb width of 2 mm and a value C(0.125) measured by using an optical comb having a comb width of 0.125 mm is equal to 0.1 or more.

According to the seventh embodiment, there is provided an anti-glare polarizer comprising
a polarizer; and
an optical film formed on the polarizer,
wherein the optical film has micro concave/convex portions on a surface,
an average interval between the micro concave and convex portions is equal to 300 μm or less, and
a differentiation with respect to angle $d\{Log(I(\alpha))\}/d\alpha$ of a logarithm intensity of reflection $Log(I(\alpha))$ in a direction of a deviation angle α from a direction of specular reflection has an extreme value.

According to the eighth embodiment, there is provided an anti-glare polarizer comprising:
a polarizer; and
an optical film formed on the polarizer,
wherein the optical film has micro concave/convex portions on a surface,
an average interval between the micro concave and convex portions is equal to 300 μm or less, and
a differentiation $d\{P(\beta)\}/d\beta$ of a histogram $P(\beta)$ to an inclination angle β of the micro concave/convex portions has an extreme value.

According to the ninth embodiment, there is provided an anti-glare polarizer comprising:
a polarizer; and
an optical film formed on the polarizer,
wherein the optical film has micro concave/convex portions on a surface,
an average interval between the micro concave and convex portions is equal to 300 μm or less, and
a value C(2.0) of transmitted image clarity measured by using an optical comb having a comb width of 2 mm in accordance with JIS-K7105 is equal to 30% or more, and
a ratio C(0.125)/C(2.0) of the value C(2.0) measured by using the optical comb having the comb width of 2 mm and a value C(0.125) measured by using an optical comb having a comb width of 0.125 mm is equal to 0.1 or more.

According to the tenth embodiment, there is provided a display apparatus comprising:
a display unit displaying an image; and
an optical film formed on a display surface side of the display unit,
wherein the optical film has micro concave/convex portions on a surface,
an average interval between the micro concave and convex portions is equal to 300 μm or less, and
a differentiation with respect to angle $d\{Log(I(\alpha))\}/d\alpha$ of a logarithm intensity of reflection $Log(I(\alpha))$ in a direction of a deviation angle α from a direction of specular reflection has an extreme value.

According to the eleventh embodiment, there is provided a display apparatus comprising:
a display unit displaying an image; and
an optical film formed on a display surface side of the display unit,
wherein the optical film has micro concave/convex portions on a surface,
an average interval between the micro concave and convex portions is equal to 300 μm or less, and
a differentiation $d\{P(\beta)\}/d\beta$ of a histogram $P(\beta)$ to an inclination angle β of the micro concave/convex portions has an extreme value.

According to the twelfth embodiment, there is provided a display apparatus comprising:

a display unit displaying an image; and
an optical film formed on a display surface side of the display unit,
wherein the optical film has micro concave/convex portions on a surface,
an average interval between the micro concave and convex portions is equal to 300 μm or less,
a value C(2.0) of transmitted image clarity measured by using an optical comb having a comb width of 2 mm in accordance with JIS-K7105 is equal to 30% or more, and
a ratio C(0.125)/C(2.0) of the value C(2.0) measured by using the optical comb having the comb width of 2 mm and a value C(0.125) measured by using an optical comb having a comb width of 0.125 mm is equal to 0.1 or more.

According to the first, fourth, seventh, and tenth embodiments, since the differentiation with respect to angle $d\{Log(I(\alpha))\}/d\alpha$ of the logarithm intensity of reflection $Log(I(\alpha))$ in the direction of the deviation angle α from the direction of specular reflection has the extreme value, diffusion reflecting characteristics in which narrow-angle reflection components adapted to improve the clarity of the image and wide-angle diffusion reflection components adapted to cause the anti-glare property are mixed can be obtained.

According to the second, fifth, eighth, and eleventh embodiments, since the differentiation $d\{P(\beta)\}/d\beta$ of the histogram $P(\beta)$ to the inclination angle β of the micro concave/convex portions on the surface of the optical film has the extreme value, a surface shape in which relatively flat portions adapted to improve the clarity of the image and portions having an inclination angle of a certain extent adapted to cause the anti-glare property are mixed is obtained. While the light is concentrated on the narrow angle and is reflected, it can be diffused and reflected to the wide angle.

According to the third, sixth, ninth, and twelfth embodiments, by specifying a value of the transmitted image clarity, the fine image can be more clearly displayed.

According to the first to twelfth embodiments, by specifying an interval between the micro concave and convex portions, the reflection on the optical film surface can be prevented.

According to the embodiments, the optical film having the anti-glare property and having the excellent transmitted image clarity can be obtained. Therefore, the display apparatus using such an optical film can realize the excellent visibility.

Additional features and advantages are described herein, and will be apparent from, the following Detailed Description and the figures.

BRIEF DESCRIPTION OF THE FIGURES

FIG. 9 is a schematic diagram for explaining a measuring principle of the transmitted image clarity.

DETAILED DESCRIPTION

Figure 1:
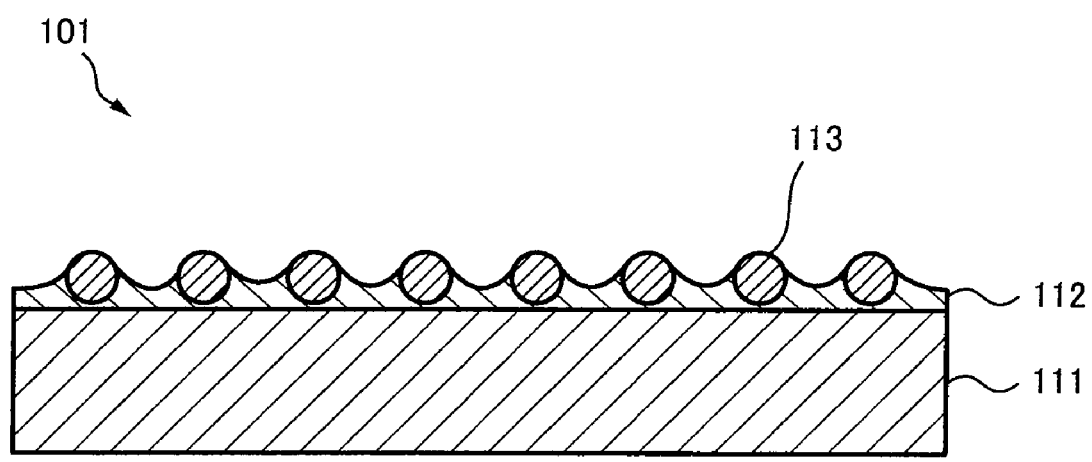
FIG. 1 is a schematic cross sectional view showing an example of a construction of a conventional anti-glare film.

Embodiments will be described hereinbelow with reference to the drawings. In all diagrams of the following embodiments, same or corresponding portions are designated by the same reference numerals.

(1) First Embodiment (1-1) Construction of Liquid Crystal Display Apparatus

Figure 3:
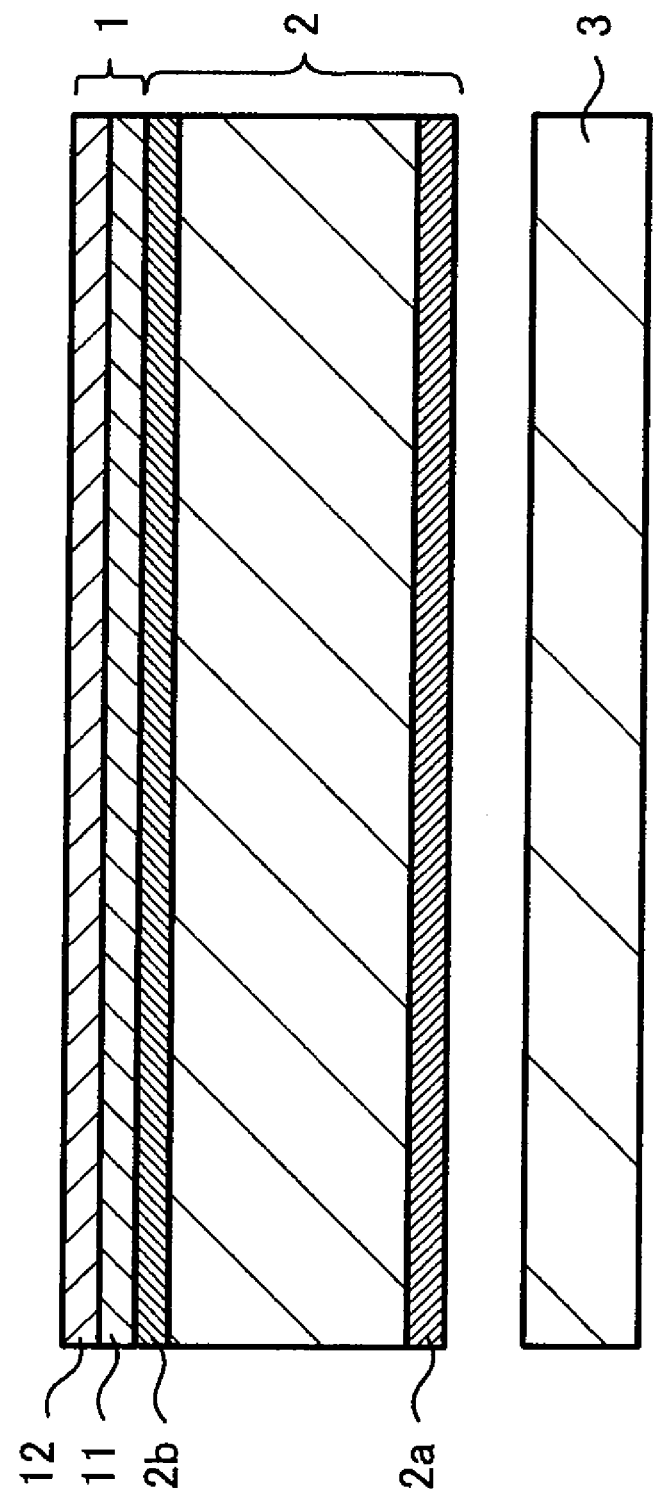
FIG. 3 is a schematic cross sectional view showing an example of a construction of a liquid crystal display apparatus according to the first embodiment.

FIG. 3 shows an example of a construction of a liquid crystal display apparatus according to the first embodiment. As shown in FIG. 3, the liquid crystal display apparatus has a backlight 3 for emitting light and a liquid crystal panel 2 for modulating light emitted from the backlight 3 in terms of the time and space and displaying an image. Polarizers 2a and 2b are provided on both surfaces of the liquid crystal panel 2, respectively. An anti-glare film 1 is provided on the polarizer 2b provided on the display surface side of the liquid crystal panel 2.

As a backlight 3, for example, a direct backlight, an edge type backlight, or a plane light source type backlight can be used. The backlight 3 has, for example, a light source, a reflecting plate, an optical film, and the like. As a light source, for example, a CCFL (Cold Cathode Fluorescent Lamp), an HCFL (Hot Cathode Fluorescent Lamp), an OEL (Organic ElectroLuminescence), an LED (Light Emitting Diode), or the like is used.

As a liquid crystal panel 2, for example, a panel of a display mode such as TN (Twisted Nematic) mode, STN (Super Twisted Nematic) mode, VA (Vertically Aligned) mode, IPS (In-Plane Switching) mode, OCB (Optically Compensated Birefringence) mode, FLC (Ferroelectric Liquid Crystal) mode, PDLC (Polymer Dispersed Liquid Crystal) mode, PCGH (Phase Change Guest Host) mode, or the like can be used.

For example, the polarizers 2a and 2b are provided on both surfaces of the liquid crystal panel 2 in such a manner that their transmission axes cross perpendicularly each other. Each of the polarizers 2a and 2b allows only one of polarization components which cross perpendicularly in the incident light to pass and shuts off the other by absorption. As polarizers 2a and 2b, for example, a film obtained by a method whereby iodine or a dichroic material such as a dichroic dye is adsorbed to a hydrophilic high polymer film such as polyvinyl alcohol system film, a partially formalized polyvinyl alcohol system film, or ethylene-vinyl acetate copolymer system partially saponificated film and the resultant film is uniaxially oriented can be used.

(1-2) Construction of Anti-Glare Film

Figure 4:
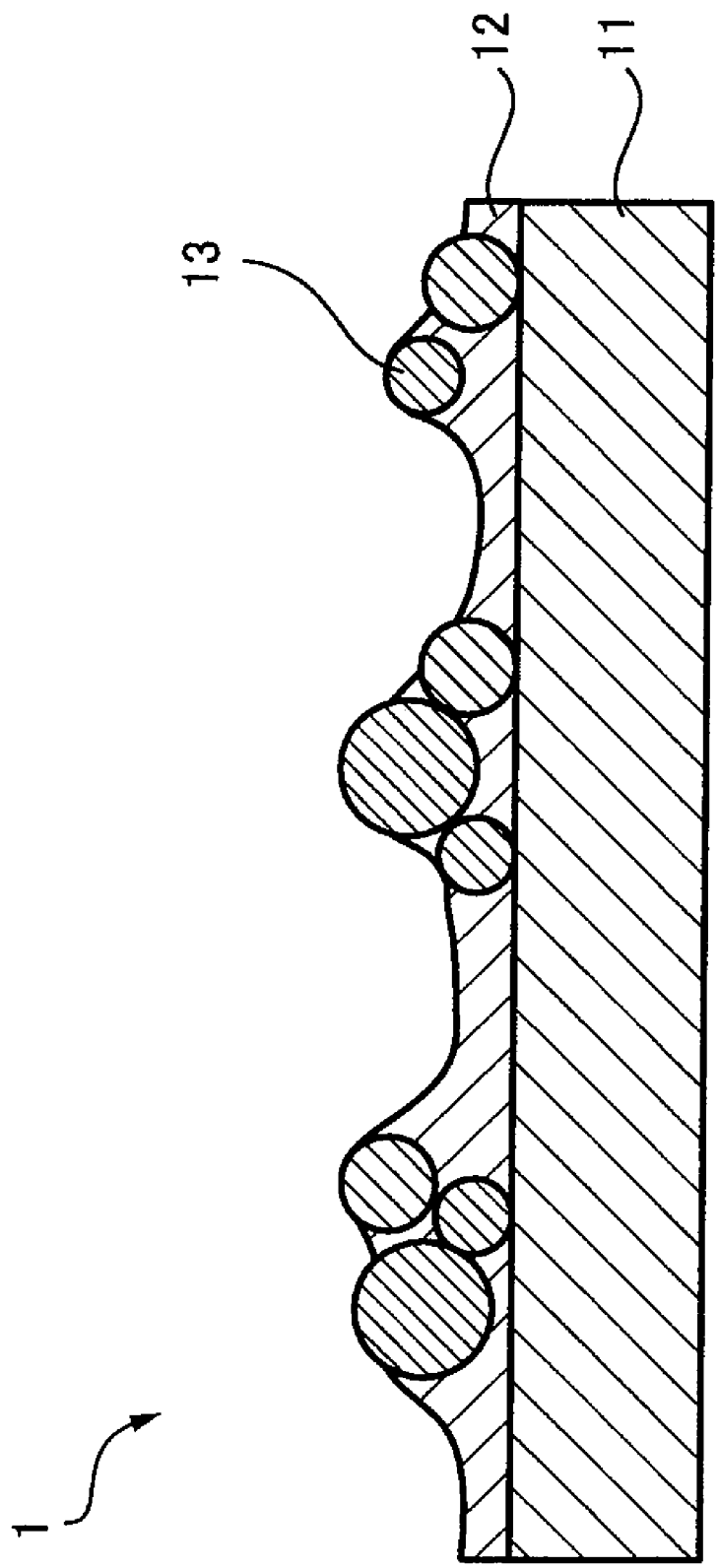
FIG. 4 is a schematic cross sectional view showing an example of a construction of an anti-glare film according to the first embodiment.

FIG. 4 is an enlarged cross sectional view showing an example of the construction of the anti-glare film 1 according to the first embodiment. As shown in FIG. 4, the anti-glare film 1 has a substrate 11 and an anti-glare layer 12 formed on the substrate 11. The anti-glare layer 12 contains fine particles 13 and micro concave/convex portions are formed on the surface.

[Diffusion Reflecting Characteristics]

In an embodiment, the anti-glare film 1 can raise a contrast of a fine video image while having an anti-glare property by specifying the diffusion reflecting characteristics as follows.

Figure 5:
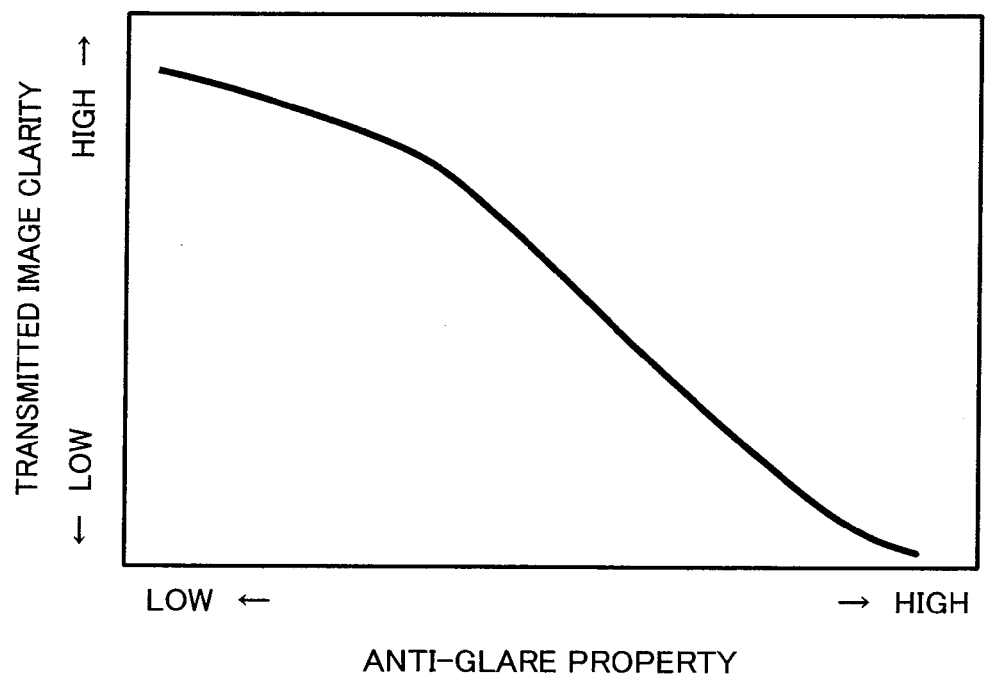
FIG. 5 is a schematic diagram for explaining a relation between transmitted image clarity and an anti-glare property in the conventional anti-glare film.

The anti-glare property is caused by diffusing the specular reflection light to the ambience for external light which enters from the ambience of the display apparatus. Therefore, the anti-glare property can be provided by such a technique that concave/convex portions are formed onto the surface of the anti-glare film 1 and a surface diffusion is performed or such a technique that media having different refractive indices are allowed to mixedly exist in an internal layer and the reflection light is diffused by using an internal diffusion caused by an interfacial reflection. However, according to such surface diffusion or internal diffusion, since a transmitted image itself of the display apparatus which passes through the anti-glare layer is also diffused, such an adverse reaction that if the diffusion is strong, the video image light is blurred and is unclearly seen occurs. That is, as shown in FIG. 5, there is a correlation in the relation between the anti-glare property and the transmitted image clarity. If the anti-glare property is raised, the transmitted image clarity deteriorates. If the transmitted image clarity is raised, the anti-glare property deteriorates. Generally, since the anti-glare property and the transmitted image clarity are balanced by adjusting a diffusion light amount, it is difficult to satisfy both of the anti-glare property and the transmitted image clarity.

Figure 2:
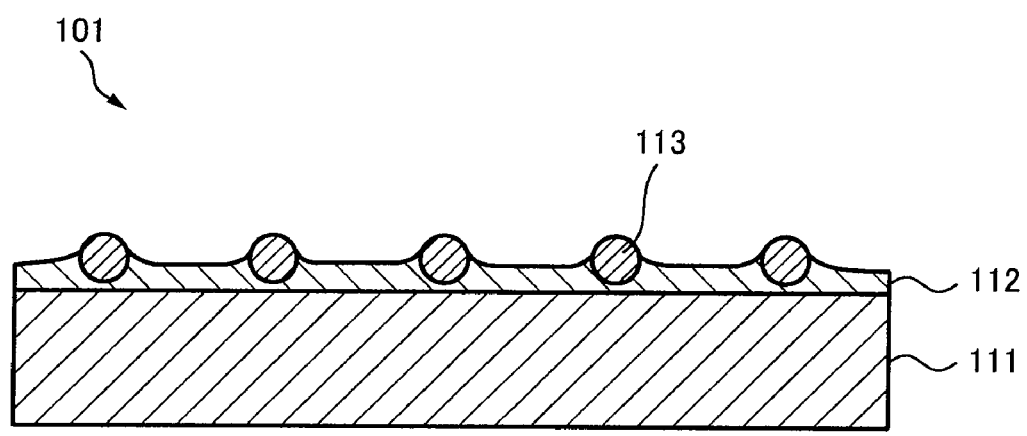
FIG. 2 is a schematic cross sectional view showing an example of a construction of a conventional anti-glare film.
Figure 6:
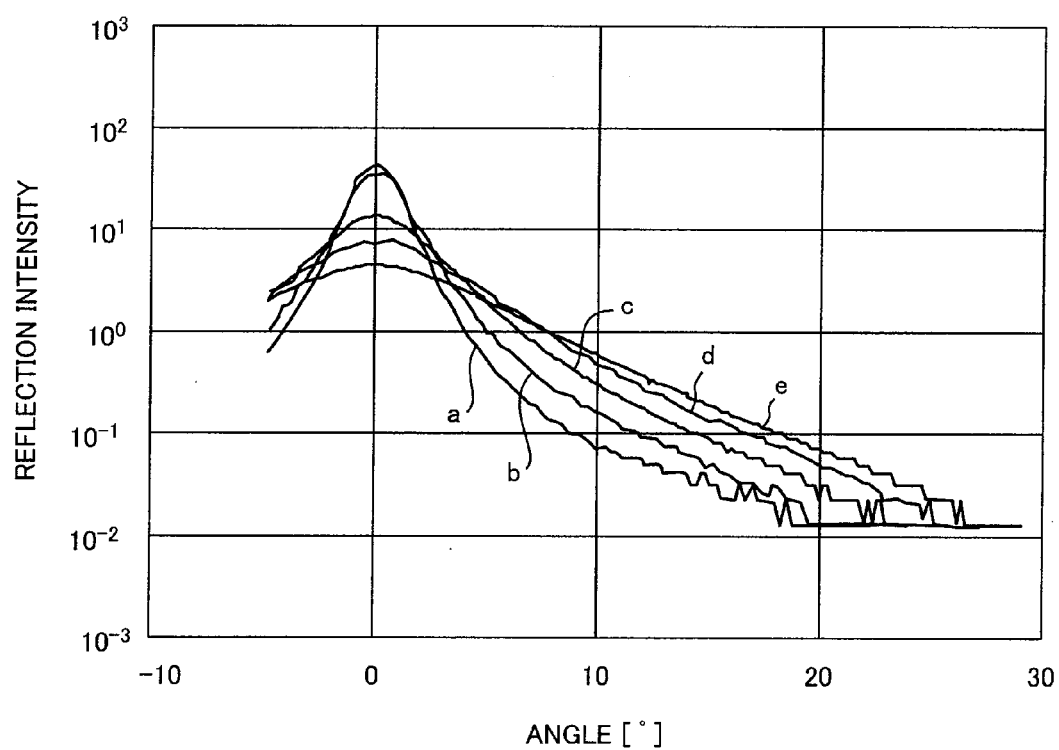
FIG. 6 is a graph showing an example of diffusion reflecting characteristics in the conventional anti-glare film.

The adjustment of the diffusion light amount will be described hereinbelow. FIG. 6 shows an example of the diffusion reflecting characteristics of the conventional anti-glare films as shown in FIGS. 1 and 2 mentioned above. An axis of abscissa indicates a reflection angle when the direction of specular reflection is set to 0° and an axis of ordinate indicates a logarithm intensity of reflection. In the conventional anti-glare films, by adjusting a particle size of the particles which are mixed, an addition amount, a film thickness, and the like, the balance of the diffusion reflecting characteristics is adjusted as shown by curves a to e in FIG. 6. For example, in the curve a, since a reflection light amount of a narrow angle is large and a diffusion reflection light amount of a wide angle is small, the anti-glare film which is excellent in transmitted image clarity but is poor in anti-glare property is obtained. On the other hand, in the curve e, the anti-glare film which is excellent in anti-glare property but is poor in transmitted image clarity is obtained.

Figure 7A:
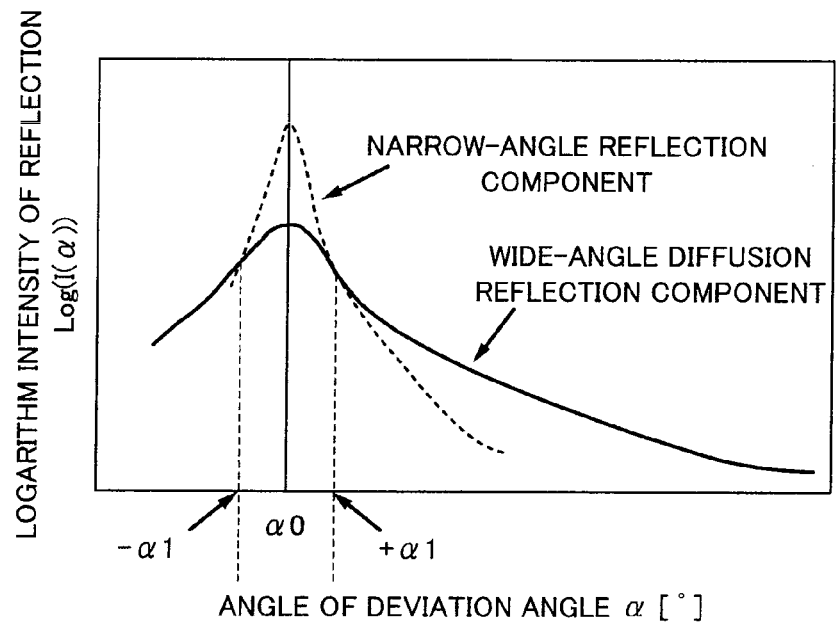
FIGS. 7A and 7B are schematic diagrams for explaining diffusion reflecting characteristics of the anti-glare film according to the first embodiment.
Figure 7B:
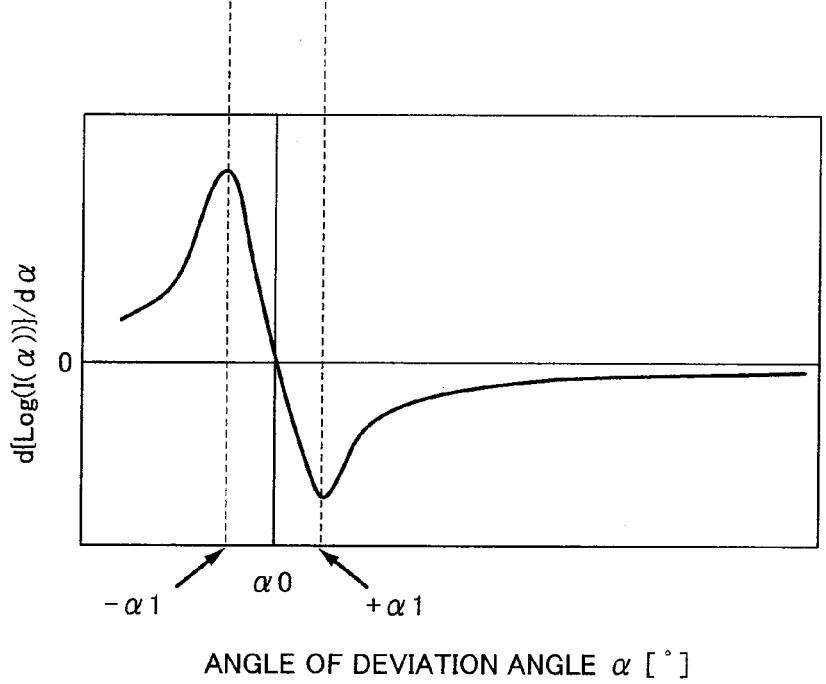
Figure 8:
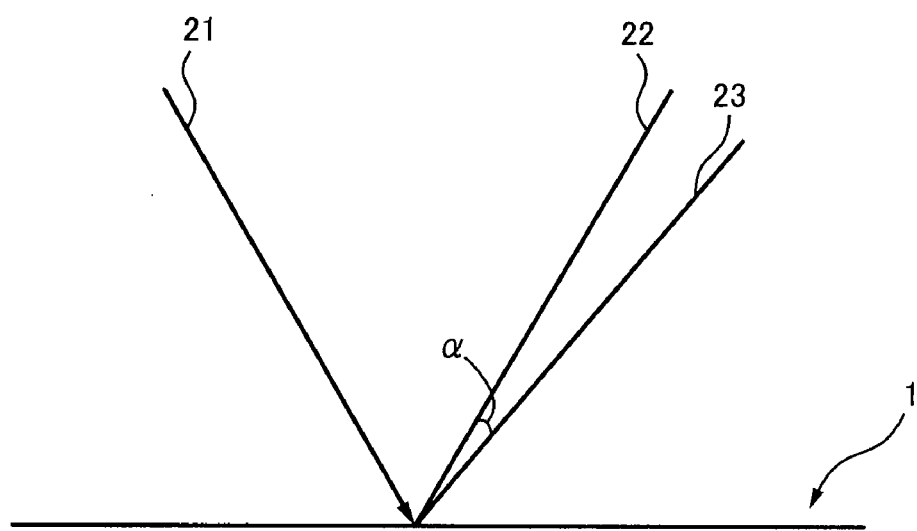
FIG. 8 is a schematic diagram schematically showing an example of a deviation angle α from reflection light of the anti-glare film according to the first embodiment.

FIG. 7A is a schematic diagram for explaining the diffusion reflecting characteristics of the anti-glare film according to the first embodiment. FIG. 7B is a graph showing a differentiation with respect to angle $d\{Log(I(\alpha))\}/d\alpha$ of a logarithm intensity of reflection $Log(I(\alpha))$ shown in FIG. 7A. FIG. 8 is a schematic diagram schematically showing an example of a deviation angle $\alpha$ shown in FIG. 7. The deviation angle $\alpha$, $I(\alpha)$, $Log(I(\alpha))$, $\alpha 0$, and $\alpha 1$ are as shown below.

$\alpha$: Deviation angle from a direction of specular reflection 22 to incident light 21 which entered the surface of the anti-glare film 1

$I(\alpha)$: Reflection intensity in a deviation angle $\alpha$ direction 23

$Log(I(\alpha))$: Logarithm intensity of reflection in the deviation angle $\alpha$ direction 23

$\alpha 0$: Angle at which the reflection intensity $I(\alpha)$ and the logarithm intensity of reflection $Log(I(\alpha))$ become maximum.

$\alpha 1$: Angle at which the differentiation $d\{Log(I(\alpha))\}/d\alpha$ of the logarithm intensity of reflection $Log(I(\alpha))$ indicates extreme values.

For example, when the reflection intensity $I(\alpha)$ and the logarithm intensity of reflection $Log(I(\alpha))$ in the direction of specular reflection 22 become maximum, the angle $\alpha 0$ is equal to 0°.

As shown in FIG. 7A, the diffusion reflecting characteristics of the anti-glare film 1 according to the first embodiment are characterized in that both of the narrow-angle reflection components concentrated on the narrow angle and the wide-angle diffusion reflection components distributed to the middle to wide angles are contained. Specifically speaking, when the angle of the deviation angle $\alpha$ is $-\alpha 1 \leq \alpha \leq \alpha 1$, the diffusion reflecting characteristics of the narrow-angle reflection components shown by a broken line are shown, and when the angle of the deviation angle $\alpha$ is $\alpha > \alpha 1$ and $\alpha < -\alpha 1$, the diffusion reflecting characteristics of the wide-angle diffusion reflection components shown by a solid line are shown. In the anti-glare film 1 showing such diffusion reflecting characteristics, the differentiation with respect to angle $d\{Log(I(\alpha))\}/d\alpha$ of the logarithm intensity of reflection Log $(I(\alpha))$ indicates extreme values at the angles $-\alpha$ and $\alpha$ as shown in FIG. 7B. That is, the differentiation $d\{Log(I(\alpha))\}/d\alpha$ is equal to a maximal value at the angle $-\alpha$ and is equal to a minimal value at the angle $\alpha$. By controlling so that the differentiation with respect to angle $d\{Log(I(\alpha))\}/d\alpha$ of the logarithm intensity of reflection $Log(I(\alpha))$ has the extreme values as mentioned above, since the transmitted light is not scattered in the portions (narrow-angle reflection components) concentrated on the narrow-angle, the transmitted light is formed as an image when observing and the transmitted image clarity is felt good. Since the light (wide-angle diffusion reflection components) which is diffused over a wide angle also exists, it feels as if there were the anti-glare property due to an influence of the reflection light. Therefore, both of the anti-glare property and the transmitted image clarity can be satisfied.

As mentioned above, in the first embodiment, since the diffusion reflecting characteristics have both of the narrow-angle reflection components and the wide-angle diffusion reflection components, the diffusion light amount can be adjusted by independently controlling them. For example, by increasing narrow-angle reflection components without causing a decrease in wide-angle diffusion reflection components, the transmitted image clarity can be further improved in a state where the anti-glare property is maintained.

When a ratio of the narrow-angle reflection intensity and the wide-angle diffusion reflection intensity is large, the narrow-angle reflection is felt strong and edges of the reflected image are liable to be observed. Therefore, it is desirable to adjust the ratio of the narrow-angle reflection intensity and the wide-angle diffusion reflection intensity. Since the human eyes have a sensitivity to the logarithm intensity of the light, it is important to adjust a difference between the logarithm intensities. Further, a way of feeling of the reflection also differs according to a degree of micro diffusion of the narrow-angle reflection itself. Therefore, when the narrow-angle reflection shown in FIG. 7 is hardly diffused, that is, when the angle α1 is small, if the ratio of the narrow-angle reflection intensity and the wide-angle diffusion reflection intensity is not small, the reflected edges are liable to be observed. When the narrow-angle reflection has been micro-diffused, that is, when the angle α1 is relatively large, even if the ratio is slightly large, the edges are difficult to be observed.

Therefore, if the deviation angle α and a logarithm intensity difference $Log(I(α0))-Log(I(α1))$ satisfy, preferably, the relation of the following equation (1), much preferably, the relation of the following equation (1'), the anti-glare property and the transmitted image clarity can be further improved.

$$Log(I(α0))-Log(I(α1))=kIα\{(α1-α0)-0.5\} (k: 0<kIα≦1) \quad \text{(Equation 1)}$$

$$Log(I(α0))-Log(I(α1))=kIα\{(α1-α0)-0.75\} (k: 0<kIα≦1) \quad \text{(Equation 1')}$$

Further, by setting the angle α1 to, preferably, 6° or less, much preferably, 4° or less, the transmitted image clarity is further improved and the high fine video image can be observed. The reason of this is as follows. When the angle α1 is larger than 6°, assuming that a refractive index of the medium is equal to about 1.5 to 1.6, an angle of refraction of the transmitted light is equal to about 2° or more. Therefore, when the display screen is observed from far away, the transmitted light is diverged in the direction out of an eyeball and is not image-formed onto a retina, so that the influence on the transmitted image clarity decreases. Consequently, it is more desirable to adjust the angle α1 in accordance with a sight distance.

[Surface Shape (Histogram P(β))]

The micro concave/convex shapes on the surface of the anti-glare layer 12 are not smoothly continuously formed but by allowing the portions having a relatively small inclination angle and the portions having an inclination of a certain extent for causing the anti-glare property to mixedly exist so as to have the following feature, the anti-glare film 1 having the anti-glare property and such a feature that it is also highly clear for a fine image can be obtained.

Specifically speaking, by measuring a 2-dimensional surface roughness curve according to JIS B0601:2001 and obtaining a differentiation of the curve, each inclination angle β is calculated. Assuming that a histogram to the inclination angle β is set to P(β), the surface shape is controlled so that the differentiation $d\{P(β)\}/dβ$ has the extreme values (maximal value and minimal value).

Since the external light is reflected to the angle which is twice as large as the surface inclination angle, the characteristics obtained by doubling the angle of the histogram P(β) correspond to the diffusion reflecting characteristics. The reason of this is as follows. That is, since there is a correlation between the histogram P(β) and the foregoing diffusion reflecting characteristics, by controlling the surface shape of the anti-glare layer 12 so that the differentiation $d\{P(β)\}/dβ$ of the histogram P(β) has the extreme values, the diffusion reflecting characteristics as mentioned above can be obtained. The histogram P(β) can be specified as follows in a manner similar to the reason by which the diffusion reflecting characteristics were specified as mentioned above.

That is, assuming that the angle at which the differentiation $d\{P(β)\}/dβ$ indicates the extreme values is set to β1 and the angle at which the histogram P(β) indicates the maximum frequency is set to β0, the inclination angle β and a logarithm frequency difference $Log(P(β0))-Log(P(β1))$ satisfy, preferably, the relation of the following equation (2), much preferably, the relation of the following equation (2'). Therefore, the anti-glare property and the transmitted image clarity can be further improved.

$$Log(P(β0))-Log(P(β1))=kPβ\{(β1-β0)-0.5\} (k: 0<kPβ≦1) \quad \text{(Equation 2)}$$

$$Log(P(β0))-Log(P(β1))=kPβ\{(β1-β0)-0.75\} (k: 0<kPβ≦1) \quad \text{(Equation 2')}$$

Further, by setting the angle β1 to, preferably, 3° or less and, much preferably, 2° or less, the transmitted image clarity is further improved and the high fine video image can be observed.

[Transmitted Image Clarity]

The transmitted image clarity can be evaluated by using an Image Clarity Meter in accordance with JIS-K7105 (testing method of optical characteristics of plastics). The evaluating method will be described by using FIG. 9. As shown in FIG. 9, the Image Clarity Meter has a light source 31, a slit 32, lenses 33 and 35, an optical comb 36, and a photosensing unit 37. A test piece 34 (for example, anti-glare film 1) as a measurement target is arranged between the lenses 33 and 35. The slit 32 is arranged at a focal position of the lens 33. The optical comb 36 is arranged at a focal position of the lens 35. As an optical comb 36, there are optical combs having comb widths of 2 mm, 1 mm, 0.5 mm, 0.25 m, and 0.125 and a proper one of them is selected and used.

The measuring method is as follows. Light emitted from the light source 31 is extracted as a pseudo point light source by the slit 32, is allowed to pass through the lens 33, is vertically transmitted as a parallel light through the test piece 34, and thereafter, is converged again by using the lens 35. The light which passed through the optical comb 36 is received by the photosensing unit 37. A dark/bright contrast is obtained by a calculation. When there is no test piece 34 or when the test piece 34 is a medium which is optically uniform, in the portion of the optical comb 36, the light is converged to a size of slit 32. Therefore, if an opening size of the optical comb 36 is wider than the slit 32, the light which is received becomes 100% and 0% in correspondence to a transparent portion and an opaque portion of the optical comb 36, respectively. On the other hand, if the test piece 34 is a member in which a blur occurs, since the image of the slit 32 which is formed onto the optical comb 36 is thickened by an influence of the blur, at the position of the transmitting portion, both edges of the image of the slit 32 overlap onto the opaque portion and the light amount of 100% decreases. At the position of the opaque portion, at both edges of the slit image, the light leaks from the opaque portion and the light amount of 0% increases.

A value C of the transmitted image clarity which is measured is defined by the following equation on the basis of a maximum value M of the transmission light amount in the transparent portion of the optical comb 36 and a minimum value m of the transmission light amount in the opaque portion.

$$\text{Value of the transmitted image clarity } C(\%) = \{(M-m)/(M+m)\} \times 100$$

This means that the larger the value C of the transmitted image clarity is, the higher the transmitted image clarity is, and the smaller the value C is, the image has what is called a blur or strain. The value C(2.0) of the transmitted image clarity measured by using the optical comb having the comb width of 2 mm in accordance with JIS-K7105 is properly called a value C(2.0) of the comb width of 2 mm hereinbelow. Similarly, the values of the transmitted image clarity measured by using the optical combs having the comb widths of 1 mm, 0.5 m, 0.25 mm, and 0.125 mm are properly called a value C(1.0) of the comb width of 1 mm, a value C(0.5) of the comb width of 0.5 mm, a value C(0.25) of the comb width of 0.25 mm, and a value C(0.125) of the comb width of 0.125 mm, respectively.

In the anti-glare film 1 according to the first embodiment, by specifying the value C of the transmitted image clarity measured in accordance with JIS-K7105 as follows, the high clear image having the anti-glare property in which the contrast is obtained even in the fine image can be obtained.

The value C(2.0) of the comb width of 2 mm of the anti-glare film 1 is equal to 30% or more, preferably, 60% or more, and much preferably, 70% or more. This is because when the value C(2.0) of the comb width of 2 mm is smaller than 30%, even an image which is not high fine and has a relatively coarse pitch is also seen as a blur image.

A ratio of the value C(0.125) of the value C(2.0) of the comb width of 2 mm and the comb width of 0.125 mm satisfies the following expressions.

$$C(0.125)/C(2.0) \geq 0.1,$$

preferably, $$C(0.125)/C(2.0) \geq 0.2,$$

much preferably, $$C(0.125)/C(2.0) \geq 0.5.$$

Thus, the high clear image having the high contrast can be obtained. The reasons of it will be described hereinbelow by using FIG. 10. For easy understanding, a case of displaying a monochromatic image will be described as an example here.

Figure 10A:
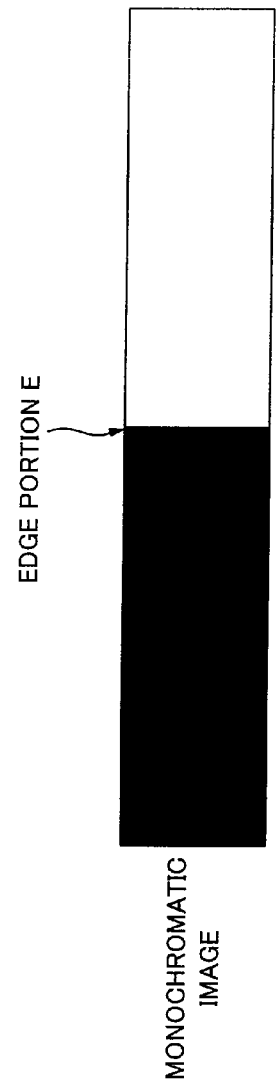
FIGS. 10A and 10B are schematic diagrams for explaining image clarity and a contrast of the image.
Figure 10B:
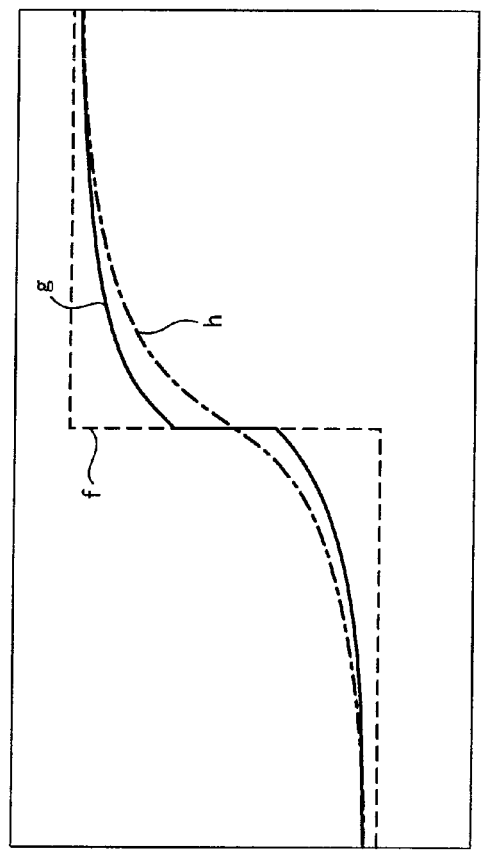

FIG. 10A shows a display of the monochromatic image. An edge portion E shown by an arrow indicates a boundary between white and black of the image. FIG. 10B shows luminance curves of the transmitted images. Each of luminance curves f to h in FIG. 10B shows the following luminance curve.

Luminance curve f: Luminance curve in the case where the monochromatic image is displayed onto the display screen to which the anti-glare film is not applied.

Luminance curve h: Luminance curve in the case where the monochromatic image is displayed onto the display screen to which the conventional anti-glare film has been applied.

Luminance curve g: Luminance curve in the case where the monochromatic image is displayed onto the display screen to which the anti-glare film 1 in the first embodiment has been applied.

The conventional anti-glare film denotes the anti-glare film 101 shown in FIG. 1 here.

When the anti-glare film is not provided for the display screen, as shown in the luminance curve f, the luminance changes suddenly in the edge portion E of the monochromatic image and rises steeply. Therefore, when the display screen is observed, the contrast of the monochromatic image is felt to be very high.

When the anti-glare film 101 is provided for the display screen, as shown in the luminance curve h, the luminance becomes gentle without changing suddenly in the edge portion E. There is, consequently, such a problem that the edge becomes unclear and the video image is seen as a blur image. In the case of showing the transmitted image luminance like a luminance curve h, the value C(2.0) of the comb width of 2 mm as a relatively coarse comb width and the value C(0.125) of the comb width of 0.125 mm as a fine comb width differ largely. Therefore, the ratio C(0.125)/C(2.0) of them is smaller than 0.1.

On the other hand, in the case where the anti-glare film 1 of the first embodiment is provided for the display screen, as shown in the luminance curve g, although the luminance change is gentle in the portions other than the edge portion E, the luminance changes suddenly in the edge portion E. Therefore, even if the portions other than the edge portion E are slightly blurred, the contrast can be felt to be high. Thus, even if the optical comb width changes slightly, the difference of the value C of the transmitted image clarity decreases. The ratio C(0.125)/C(2.0) of the value C(2.0) of the comb width of 2.0 mm and the value C(0.125) of the comb width of 0.125 mm to is equal 0.1 or more.

As mentioned above, although it is defined as a ratio of the value C(2.0) of the comb width of 2.0 mm and the value C(0.125) of the comb width of 0.125 mm in the first embodiment, it means that there is not a large change in transmitted image clarity at the coarse pitch and the fine pitch.

In the anti-glare film 1 of the first embodiment, since it is excellent in the clarity at the fine pitch as compared with the conventional one, it is considered that the fine image can be more clearly displayed and the edge can be made conspicuous and the image having the high contrast can be obtained.

[Average Interval Between Micro Concave and Convex Portions]

An average interval between micro concave and convex portions (average mountain/valley interval: Sm) lies within a range of, preferably, 5 μm or more to 300 μm or less, much preferably, 5 μm or more to 220 μm or less. By setting the average interval to 300 μm or less, when the anti-glare film 1 is applied to the image display apparatus and the user goes away from the film to the optimum monitoring distance of the image display apparatus and observes it, the interval between the micro concave and convex portions is equal to the separable size or less and the high clear anti-glare film 1 on which the reflection is not sighted can be obtained. That is, when the average interval is equal to 300 μm or more, the portions having the relatively small inclination angle which specify the narrow-angle reflection and the portions having the inclination of a certain extent for causing the anti-glare property are separately sighted and the reflection is felt strong. On the other hand, when the average interval is smaller than 5 μm, it is difficult to individually control the narrow-angle reflecting components and the wide-angle diffusion reflection components in the diffusion reflecting characteristics. The portion having the relatively small inclination angle on the surface of the anti-glare layer 12 is properly called a narrow-angle reflecting portion and the portion having the inclination of a certain extent is properly called a wide-angle diffusion reflecting portion hereinbelow.

Figure 11B:
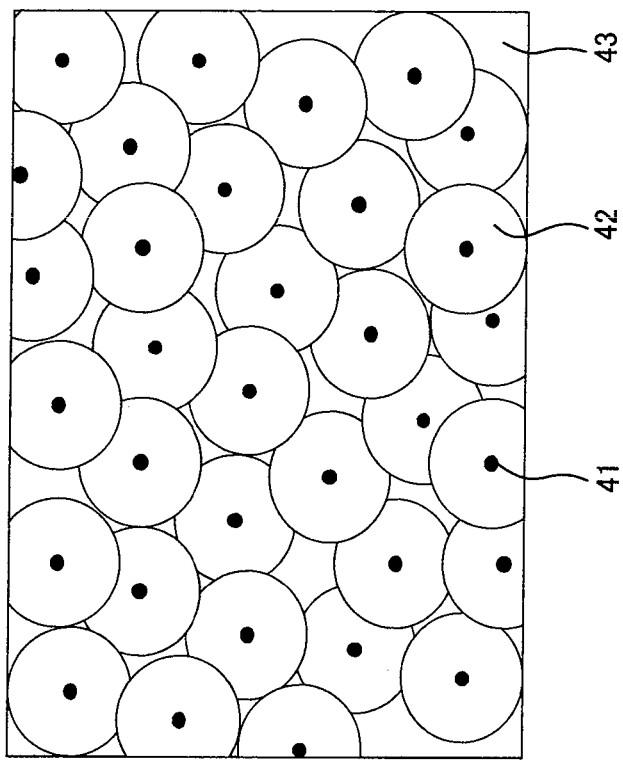
FIGS. 11A and 11B are schematic diagrams showing examples of distribution of narrow-angle reflecting portions and wide-angle diffusion reflecting portions of the anti-glare film according to the first embodiment.
Figure 11A:
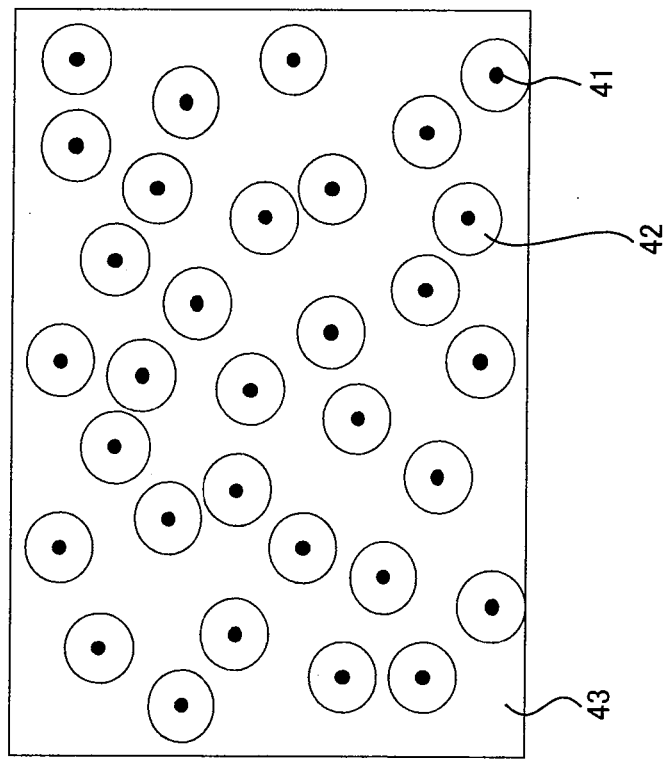

FIG. 11 shows examples of distribution of the narrow-angle reflecting portions and the wide-angle diffusion reflecting portions on the surface of the anti-glare layer 12 of the anti-glare film 1. As shown in FIG. 11, wide-angle diffusion reflecting portions 42 having an inclination angle of a certain extent are distributed around a fine particle projection 41 which is formed by the fine particle 13 and relatively flat narrow-angle reflecting portions 43 are distributed among the wide-angle diffusion reflecting portions 42. In both of FIGS. 11A and 11B, the average interval between the micro concave and convex portions is equal to 300 μm or less. However, in the case of distribution as shown in FIG. 11A, since the narrow-angle reflecting components 43 are continuously formed, the reflection is felt strong. Therefore, it is preferable to control the ratio of the wide-angle diffusion reflecting portions 42 and the narrow-angle reflecting portions 43 so as to obtain distribution as shown in FIG. 11B. By controlling those ratios, the foregoing diffusion reflecting characteristics can be obtained.

The distribution of the wide-angle diffusion reflecting portions 42 and the narrow-angle reflecting portions 43 as shown in FIG. 11 can be confirmed by obtaining height images on the uneven surface by using, for example, a confocal type laser microscope, a tracer type roughness measuring instrument, or the like.

(Anti-Glare Layer)

An average film thickness of the anti-glare layer 12 is equal to, preferably, 3 to 30 μm, and much preferably, 4 to 15 μm. This is because when the film thickness is smaller than 3 μm, it is difficult to obtain a desired hardness and, when the film thickness is larger than 30 μm, there is a case where the resin is curled in the step of hardening the resin upon manufacturing.

As a fine particle 13, for example, a spherical or flat inorganic fine particle or organic fine particle or the like is used. The mean diameter of fine particles 13 preferably lies within a range from about 5 nm to about 15 μm, much preferably, a range from 1 μm to 10 μm, and further preferably, a range from 1.5 μm to 7.5 μm. The reasons of it are as follows. If the mean diameter is smaller than 1.5 μm, the particles in the coating material are liable to be aggregated and it is difficult to control the proper surface shape. Even if the small particles can be dispersed by using a particle dispersing agent or the like, when the mean diameter is less than 5 nm, the surface roughness of the anti-glare layer 12 becomes too fine and the anti-glare property is poor. On the other hand, if it is larger than 15 μm, the film thickness of anti-glare layer 12 increases, so that there is a case where the resin is curled in the step of hardening the resin upon manufacturing and, if it is larger than 7.5 μm, a glare occurs when they are applied to the high fine display apparatus. The mean diameter of the fine particles 13 can be measured by, for example, a dynamic light scattering method, a laser diffracting method, a centrifugal sedimentation method, an FFF (Field Flow Fractionation) method, a pore electric resistance method, or the like.

As organic fine particles, for example, the beads made of an acrylic resin (PMMA), styrene (PS), an acryl-styrene copolymer, a melamine resin, polycarbonate (PC), or the like can be used. The organic fine particle is not particularly limited to a cross-link, an uncross-link, or the like but any organic fine particle made of plastics or the like can be used.

As inorganic fine particles, they are not particularly limited to, for example, regular silica, alumina, calcium carbonate, barium sulfate, or the like, but well-known inorganic fine particles can be used. They can be properly selected in consideration of a refractive index difference or the like with the resin which is used.

(Substrate)

As a substrate 11, for example, a film, sheet, base plate, or the like having transparency can be used. As a material of the substrate 11, for example, a well-known high polymer material can be used. As a well-known high polymer material, for example, triacetyl cellulose (TAC), polyester (TPEE), polyethylene terephthalate (PET), polyimide (PI), polyamide (PA), aramid, polyethylene (PE), polyacrylate, polyether sulfone, polysulfone, polypropylene (PP), diacetyl cellulose, polyvinyl chloride, an acrylic resin (PMMA), polycarbonate (PC), an epoxy resin, a urea resin, an urethane resin, a melamine resin, or the like can be mentioned. Although a thickness of substrate 111 preferably lies within a range from 38 μm to 100 μm from a viewpoint of productivity, it is not particularly limited to such a range.

It is preferable that the substrate 1 has a function as a protecting film of the polarizer 2b. This is because since there is no need to additionally provide the protecting film for the polarizer 2b, the polarizer 2b having the anti-glare film 1 can be thinned.

(1-3) Manufacturing Method of Anti-Glare Film

Subsequently, an example of a manufacturing method of the anti-glare film 1 having the foregoing construction will be described. According to the manufacturing method of the anti-glare film 1, the substrate 11 is coated with a coating material containing the fine particles 13, a resin, and a solvent, the solvent is dried, and thereafter, the resin is hardened.

(Adjustment of Coating Material)

First, for example, the resin, the foregoing fine particles 13, and the solvent are mixed by a stirrer such as a disper or the like or a disperser such as a beads mill or the like, thereby obtaining the coating material in which the fine particles 13 have been dispersed. In this instance, a light stabilizer, an ultraviolet absorbent, an antistatic agent, a flame resistance, an oxidation inhibitor, or the like may be further added. Silica fine particles or the like may be further added as a viscosity adjuster.

As a solvent, for example, an organic solvent which dissolves a resin raw material that is used, has good wettability with the fine particles 13, and does not bleach the substrate 11 or the like can be used. As such an organic solvent, for example, tertiary butanol, isopropyl acetate, or the like can be mentioned.

As a resin, for example, an ionizing radiation-curable resin which is hardened by an ultraviolet ray or an electron beam or a thermosetting resin which is hardened by heat is preferable from a viewpoint of easiness of manufacturing, and a photosensitive resin which can be hardened by an ultraviolet ray is most preferable. As such a photosensitive resin, for example, an acrylate system resin such as urethane acrylate, epoxy acrylate, polyester acrylate, polyol acrylate, polyether acrylate, or melamine acrylate can be used. As characteristics after the hardening, a photosensitive resin having an excellent translucent property is particularly preferable from a viewpoint of image permeability, a photosensitive resin having a high hardness is particularly preferable from a viewpoint of a damage resistance, and one of them can be properly selected. The ionizing radiation-curable resin is not particularly limited to an ultraviolet hardening type resin. Although any resin can be used so long as it has the translucent property, a resin in which a hue of the transmitted light and a transmitted light amount are not remarkably changed by coloring and haze is preferable.

Such a photosensitive resin is obtained by mixing a photopolymerization initiator into an organic material such as monomer, oligomer, or polymer which can form the resin. For example, the urethane acrylate resin is obtained by allowing an isocyanate monomer or prepolymer to react to polyester polyol and by allowing a monomer of an acrylate or methacrylate system having a hydroxyl group to react to an obtained product.

As a photopolymerization initiator contained in the photosensitive resin, for example, a benzophenone derivative, an acetophenone derivative, an anthraquinone derivative, or the like can be used solely or in combination. A component which enables a coating film to be more preferably formed, for example, an acrylic resin or the like may be further properly selectively mixed into the photosensitive resin.

A urethane resin, an acrylic resin, a methacrylic resin, a styrene resin, a melamine resin, a cellulosic resin, ionizing radiation-curable oligomer, or thermosetting oligomer which is fixed by at least drying can be properly mixed into the photosensitive resin and used. By properly mixing the above resin, the hardness or curl of the anti-glare layer 12 can be adjusted. The photosensitive resin is not limited to that mentioned above but polymer having an ionizing radiation sensitizing group such as acryl double bond or a thermosetting group such as a —OH group can be preferably used.

In the coating material which is adjusted as mentioned above, it is preferable to adjust a specific gravity difference between the fine particles 13 and the liquid components contained in the coating material before coating, thereby causing proper sedimentation and/or aggregation of the fine particles 13. This is because after the coating, desired micro concave/convex portions in which the narrow-angle reflecting portions having the relatively small inclination angle and the wide-angle reflecting portions having the inclination exist mixedly can be formed on the coated film surface. It is also preferable to adjust a surface tension difference between the fine particles 13 and the resin. This is because the curing shape of the resin which couples the fine particle 13 and the fine particle 13 can be controlled at the time of drying and curing the resin.

(Coating)

Subsequently, the substrate 11 is coated with the coating material obtained as mentioned above. It is coated with the coating material so that an average film thickness after the drying is equal to, preferably, 3 to 30 μm, much preferably, 4 to 15 μm. There is a case where when the film thickness is smaller than such a numerical value range, it is difficult to obtain a desired hardness, and when the film thickness is larger than such a numerical value range, the resin is largely curled at the time of hardening of the resin. The coating method is not particularly limited but a well-known coating method can be used. As a well-known coating method, for example, as a well-known coating method, for example, a micro gravure coating method, a wire bar coating method, a direct gravure coating method, a die coating method, a dipping method, a spray coating method, a reverse roll coating method, a curtain coating method, a comma coating method, a knife coating method, a spin coating method, or the like can be mentioned.

(Drying•Curing)

After the coating of the coating material, by drying it, the solvent is volatilized. A drying temperature and a drying time can be properly decided on the basis of a boiling point of the solvent contained in the coating material. In this case, it is preferable to select them within such a range that a deformation of the substrate is not caused by the heat contraction in consideration of a heat resistance of the substrate 11.

After drying, by hardening the resin, the anti-glare layer 12 is formed. There are, for example, an electron beam, an ultraviolet ray, visible light, a gamma ray, and the like as a hardening energy source. The ultraviolet ray is preferable from a viewpoint of producing facilities. Further, the ultraviolet ray source is not particularly limited but a high pressure mercury lamp, a metal halide lamp, or the like is properly used. As a cumulative irradiation amount, a cumulative irradiation amount of such an extent that the hardening of the resin which is used and after-yellowing of the resin and the substrate 11 do not occur can be properly selected. An atmosphere of the irradiation can be properly selected in accordance with a degree of the resin hardening. The irradiation can be performed in the air or an inert atmosphere such as nitrogen or argon.

It is preferable to adjust temperatures of the substrate 11 and the coated film and control the curing shape of the resin which couples the fine particle 13 and the fine particle 13 upon curing. For example, by setting the temperature of the substrate 11 to a high temperature of a certain extent, the resin on the substrate 11 is leveled and relatively flat narrow-angle reflecting portions are formed on the surface of the anti-glare layer 12. Therefore, the temperature of the substrate 11 is adjusted in consideration of the ratio of the narrow-angle reflecting portions and the wide-angle reflecting portions.

The target anti-glare film is obtained in this manner.

As mentioned above, in the anti-glare film 1 according to the first embodiment, by controlling the micro concave/convex portions on the surface and respectively controlling the ratio of the narrow-angle reflection components and the wide-angle diffusion reflection components in the diffusion reflecting characteristics, the anti-glare film in which the high clear video image can be sighted while maintaining the anti-glare property can be obtained. On the other hand, since the value $C(2.0)$ having the comb width of 2 mm is equal to 30% or more and the ratio $C(0.125)/C(2.0)$ of the value $C(2.0)$ of the comb width of 2 mm and the value $C(0.125)$ of the comb width of 0.125 mm is equal to 0.1 or more, the fine image can be more clearly displayed and the edge can be made conspicuous. Therefore, the anti-glare film having the excellent transmitted image clarity and the excellent anti-glare property can be realized. By using the anti-glare film 1 for the display apparatus such as a liquid crystal display apparatus or the like, the visibility of the displayed image can be improved.

(2) Second Embodiment

Subsequently, the second embodiment will be described. Although the case where the micro concave/convex portions are formed on the surface of anti-glare layer 12 by the fine particles 13 has been described in the foregoing first embodiment, a case where micro concave/convex portions are formed on the surface of anti-glare layer 12 by a shape transfer will be described in the second embodiment.

(2-1) Construction of Anti-Glare Film

Figure 12:
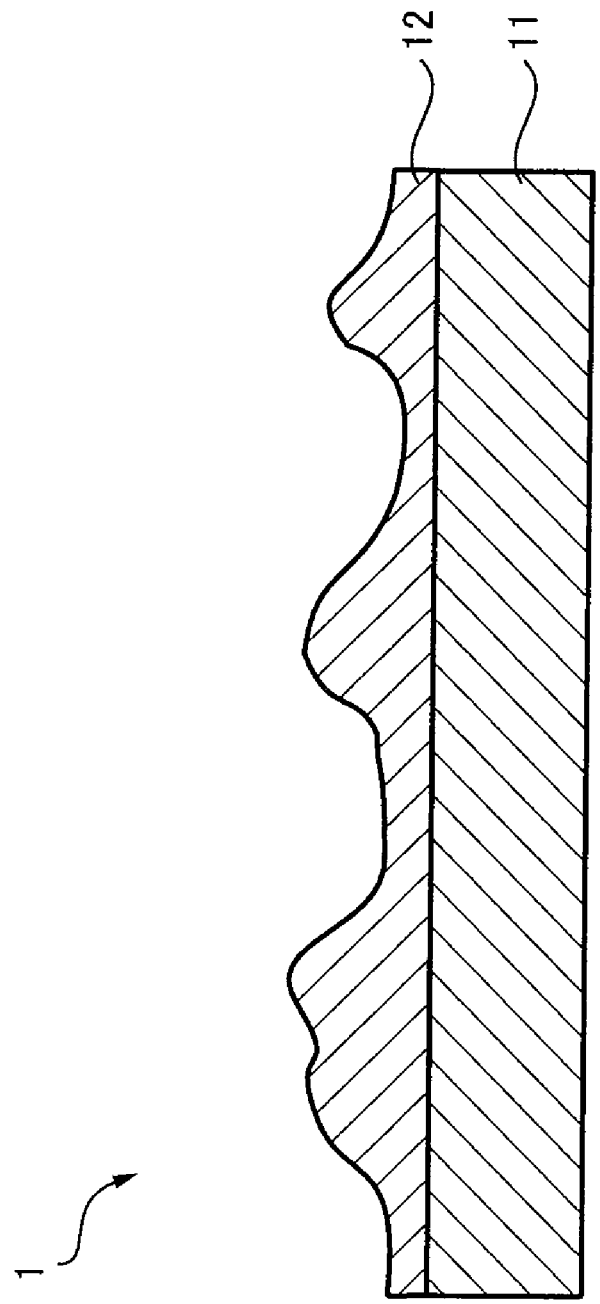
FIG. 12 is a schematic cross sectional view showing an example of a construction of an anti-glare film according to the second embodiment.

FIG. 12 shows an example of a construction of an anti-glare film 1 according to the second embodiment. As shown in FIG. 12, the anti-glare film 1 has the substrate 11 and the anti-glare layer 12 formed on the substrate 11. The construction is similar to that in the first embodiment except that the anti-glare layer 12 does not contain the fine particles 13.

(2-2) Manufacturing Method of Anti-Glare Film

Subsequently, an example of the manufacturing method of the anti-glare film 1 having the foregoing construction will be described with reference to FIG. 13. In the manufacturing method of the anti-glare film 1, a mother plate is produced by microfabrication and desired micro concave/convex portions are obtained by the shape transfer method.

(Producing Step of Mother Plate)

Figure 13A:
FIGS. 13A to 13E are schematic cross sectional views showing an example of a manufacturing method of the anti-glare film according to the second embodiment.

First, a substrate serving as a target to be processed is prepared. As a shape of the substrate, for example, a plate shape, a sheet shape, a film shape, a black shape, or the like can be mentioned. As a material of the substrate, for example, plastics, metal, glass, or the like can be mentioned. Subsequently, the substrate is processed by using a mask imaging method using, for example, a KrF excimer laser and micro concave/convex shapes corresponding to the surface of the anti-glare layer 2 are patterned onto the surface of the substrate. Thus, as shown in FIG. 13A, a mother plate 51 having micro concave/convex portions opposite to those of the anti-glare layer 12 is obtained.

(Producing Step of Duplicating Die)

Figure 13B:

Subsequently, for example, by an electroless plating method, a conductive film is formed onto the micro concave/convex portions of the mother plate 51 obtained as mentioned above. Now, the conductive film is, for example, a metal coating film made of a metal such as nickel or the like. Subsequently, the mother plate 51 formed with the conductive film is attached to an electrocasting apparatus and a metal plated layer such as a nickel plated layer is formed onto the conductive film by, for example, an electroplating method. After that, the metal plated layer is exfoliated from the mother plate 51. Thus, as shown in FIG. 13B, a duplicating die 52 having micro concave/convex portions opposite to those of the mother plate 51 is obtained.

Figure 13C:

Subsequently, for example, by an electroplating method, a metal plated layer such as a nickel plated layer is formed onto the micro concave/convex portions of the duplicating die 52 obtained as mentioned above. After that, the metal plated layer is exfoliated from the duplicating die 52. Thus, as shown in FIG. 13C, a duplicating die 53 having micro concave/convex portions similar to those of the mother plate 51 is obtained.

(Forming Step of Anti-Glare Layer)

Subsequently, a photosensitive resin such as an ultraviolet hardening resin is casted onto the micro concave/convex portions of the duplicating die 53 obtained as mentioned above. As a photosensitive resin adapted to form the anti-glare layer 12, for example, a photosensitive resin similar to that in the first embodiment can be used. Since the micro concave/convex portions of the anti-glare layer 12 are obtained by the shape transfer, particularly, there is no need to allow the fine particles to be contained in the photosensitive resin. However, the fine particles may be added as fine particles for finely adjusting a haze value or the surface shape.

Figure 13D:
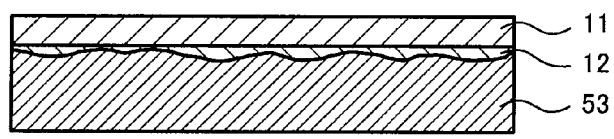
Figure 13E:
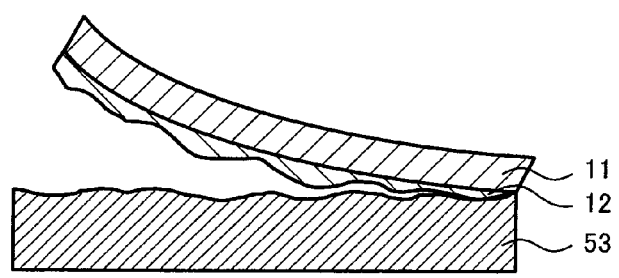

Subsequently, as shown in FIG. 13D, the substrate 11 serving as a supporting substrate is overlaid onto the duplicating die 53. A force is applied to the substrate 11 by, for example, a rubber roller, thereby uniforming a thickness of photosensitive resin. Subsequently, for example, light such as ultraviolet rays is irradiated from the substrate 11 side, thereby hardening, for example, the photosensitive resin. After that, as shown in FIG. 13E, the hardened photosensitive resin is exfoliated from the duplicating die 53. In this manner, the anti-glare layer 12 is formed onto one principal plane of the substrate 11 and the target anti-glare film 1 is obtained.

According to the second embodiment, an effect similar to that in the foregoing first embodiment can be obtained.

(3) Third Embodiment (3-1) Construction of Touch Panel

Figure 14:
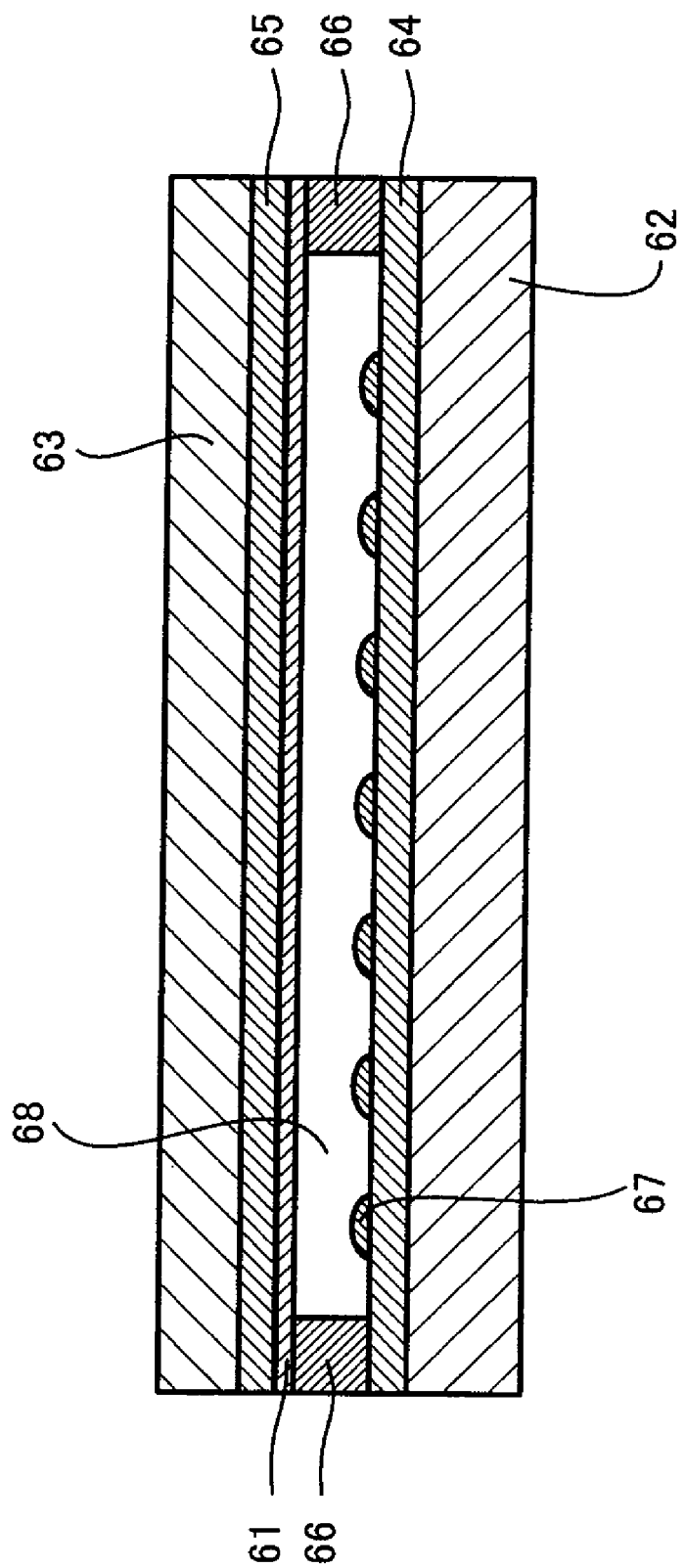
FIG. 14 is a schematic cross sectional view showing an example of a construction of a touch panel of a display apparatus according to the third embodiment.

FIG. 14 is a cross sectional view showing an example of a construction of a touch panel according to the third embodiment. This touch panel is a touch panel of a resistance film type. It is provided on the display surface side of each of various kinds of display apparatuses, for example, as well as a liquid crystal display apparatus as shown in FIG. 3 and constructs a touch panel display.

A lower substrate 62 is a light-transmitting substrate such as glass. A transparent electrode film 64 is formed on the lower substrate 62. A dot spacer 67 is formed on the transparent electrode film 64. An insulating spacer 66 is arranged in a peripheral portion of the lower substrate 62. A transparent film 63 is arranged through an air layer 68 so as to face the lower substrate 62. The transparent film 63 becomes a touch panel surface which is pressed by a finger, a pen, or the like. A film having flexibility which can be deformed in response to a pressure of each of them. A transparent electrode film 65 is formed on the transparent film 63. An uneven layer 61 is provided on the surface of at least one of the transparent electrode film 64 and the transparent electrode film 65, for example, on the transparent electrode film 65.

According to the touch panel with such a construction, when the surface of the transparent film 63 is pressed by a finger, a pen, or the like, the transparent film 63 is bent. The transparent electrode film 65 at the pressed position of the transparent film 63 is come into contact with the transparent electrode film 64 on the lower substrate 62 and a current flows. The pressed position is detected by measuring a voltage dividing ratio due to resistances of the transparent electrode film 64 and the transparent electrode film 65 at this time.

(3-2) Construction of Uneven Layer

As for the uneven layer 61 which is used for the touch panel in the third embodiment, an optical film similar to the anti-glare film 1 in each of the first and second embodiments mentioned above can be used. Therefore, a description of a construction and a manufacturing method of the uneven layer 61 is omitted.

When the surface of the transparent film 63 is pressed, the uneven layer 61 prevents Newton's rings which are caused by the light interference since a thickness in air layer 58 differs slightly depending on the position and functions as an anti-Newton's ring layer.

In the uneven layer with the conventional construction, there is such a problem that when the touch panel is attached to the display apparatus with high resolution, a luminance variation is visually recognized as a glare on the display screen and the visibility deteriorates. However, according to the uneven layer 61 in the third embodiment, even when it is used in the display apparatus with high resolution, the glare due to the luminance variation on the display surface can be suppressed.

As mentioned above, according to the third embodiment, the uneven layer 61 (anti-Newton's ring layer) for the touch panel in which the glare on the display surface can be suppressed while having the anti-Newton's ring effect is obtained.

EXAMPLES

Although the embodiments will be specifically described hereinbelow by Examples, the embodiments are not limited to those Examples.

In the Examples, a mean diameter of the fine particles and a dried film thickness of anti-glare layer are measured as follows.

(Mean Diameter of Fine Particles)

The mean diameter of the fine particles is obtained by measuring the particle sizes by a cotter multisizer and averaging obtained data.

(Dried Film Thickness of Anti-Glare Layer)

The dried film thickness (average film thickness) of the anti-glare layer is obtained as follows by using a Thickness Measuring Instrument (manufactured by TESA Co., Ltd.). First, a contact terminal having a cylindrical shape of 6 mmϕ is used. A cylindrical terminal is come into contact with the anti-glare layer at such a small load that the anti-glare layer is not broken. The thickness is measured at five arbitrary points and an average value $D_A$ of the total thickness of the anti-glare film is obtained. Further, a thickness of uncoated portion of the same substrate is measured and a thickness $D_B$ of substrate is obtained. A value obtained by subtracting the thickness $D_B$ of substrate from the average value $D_A$ is set to a thickness of anti-glare layer. If the uncoated portions is not obtained, a cutting surface of the anti-glare film is produced by a microtome method or the like and the thickness of substrate can be measured. However, since the thickness is a microscopic thickness, it is preferable to obtain it as an average film thickness like a former mean value.

Example 1

A raw material shown in the following coating material compositions is mixed and the resultant coating material is stirred for 2 hours by the a disper. After that, the material is filtered through a filter of 20 µm having a roughness which is three or more times as large as the mean diameter, thereby obtaining the coating material. One surface of a TAC film (manufactured by Fuji Photo Film Co., Ltd.) having a thickness of 80 µm is coated with the resultant coating material by a micro gravure of 90 lines at a circumferential speed ratio of 150% and a coating rate of 20 m/min.
(Coating Compositions)
 Multifunctional acryl oligomer: 100 parts by weight
 Photopolymerization initiator (IRGACURE 184 manufactured by CIBA-GEIGY Co., Ltd.): 3 parts by weight
 Solvent (t-butanol): 90 parts by weight
 Crosslinkable styrene beads SBX6 obtained by classifying and removing the particles of 10 µm or more (manufactured by SEKISUI PLASTICS CO., LTD.): 6 parts by weight
A mean diameter of the crosslinkable styrene beads SBX6 is equal to 5.9 µm.

After the coating, the coating material is dried for 2 minutes in a drying furnace at 80° C. Thereafter, the film is adjusted to a temperature of 40° C. and a curing process is executed by irradiating the ultraviolet rays at a rate of 300 mJ/cm$^2$, thereby forming an anti-glare layer having a dried film thickness of 8.9 µm. In this manner, a target anti-glare film is obtained.

Example 2

An anti-glare film is obtained in a manner similar to Example 1 except that the coating rate is set to 50 m/min and the dried film thickness of the anti-glare layer is set to 10.5 µm by adjusting the number of gravure lines and the coating conditions.

Example 3

An anti-glare film is obtained in a manner similar to Example 1 except that the dried film thickness of the anti-glare layer is set to 7.4 µm by adjusting the number of gravure lines and the coating conditions.

Example 4

An anti-glare film is obtained in a manner similar to Example 1 except that a raw material shown in the following coating material compositions is mixed and the dried film thickness of the anti-glare layer is set to 7.3 µm.
(Coating Material Compositions)
 Multifunctional acryl oligomer: 100 parts by weight
 Photopolymerization initiator (IRGACURE 184 manufactured by CIBA-GEIGY Co., Ltd.): 3 parts by weight
 Solvent (methylisobutyl ketone MIBK): 150 parts by weight
  (propyleneglycol monomethylether PGM): 37 parts by weight
 Silica beads (SS50B manufactured by TOSOH SILICA CORPORATION): 12 parts by weight
 Dispersing agent (DOPA 15 manufactured by Shin-Etsu Chemical Co., Ltd.): 10 parts by weight
A mean diameter of the silica beads SS50B is equal to 1.5 µm.

Example 5

A raw material shown in the following coating material compositions is mixed and the resultant coating material is stirred for 2 hours by the disper. After that, the material is filtered through a mesh of 20 µm, thereby obtaining the coating material. One surface of the TAC film (manufactured by Fuji Photo Film Co., Ltd.) having a thickness of 80 µm is coated with the resultant coating material by using a bar coater.
(Coating Material Compositions)
 Multifunctional acryl oligomer: 100 parts by weight
 Photopolymerization initiator (IRGACURE 184 manufactured by CIBA-GEIGY Co., Ltd.): 3 parts by weight
 Solvent (t-butanol): 165 parts by weight
  Monodisperse cross-linking styrene beads having a particle size of 5 µm (SX500 manufactured by Soken Chemical & Engineering Co., Ltd.): 3 parts by weight
After the coating, an anti-glare film in which a dried film thickness of the anti-glare layer is equal to 4.6 µm is obtained in a manner similar to Example 1.

Example 6

An anti-glare film is obtained in a manner similar to Example 1 except that a raw material shown in the following coating material compositions is mixed and the dried film thickness of the anti-glare layer is set to 8.5 µm by adjusting the number of gravure lines and the circumferential speed ratio.
(Coating Material Compositions)
 Multifunctional acryl oligomer: 95 parts by weight
 Acryl poly system polymer: 5 parts by weight
  Photopolymerization initiator (IRGACURE 184 manufactured by CIBA-GEIGY Co., Ltd.): 5 parts by weight
 Solvent (butyl acetate): 65 parts by weight
  (dimethyl carbonate): 53 parts by weight
 Crosslinkable MS beads (Techpolymer manufactured by SEKISUI
 PLASTICS CO., LTD., refractive index: 1.560, mean diameter: 5.2 µm, fluctuation coefficient: 29): 8 parts by weight Example 7

First, a raw material shown in the following coating material compositions is mixed and the resultant coating material is stirred for 2 hours, thereby obtaining a coating material. Subsequently, the TAC film (manufactured by Fuji Photo Film Co., Ltd.) having a thickness of 80 µm is coated with the resultant coating material at a rate of 30 m/min by a die coater. Subsequently, after the coating material was dried for 2 minutes in a drying furnace at 80° C., the ultraviolet rays are irradiated at 500 mJ/cm$^2$, thereby forming an anti-glare layer having a dried film thickness of 7.3 μm. In this manner, an optical film of Example 7 is obtained.

(Coating Material Compositions)
6-functional urethane acryl oligomer: 90 parts by weight
   Acrylic polymer: 10 parts by weight
Initiator (IRGACURE 184): 5 parts by weight
Solvent (butyl acetate): 65 parts by weight
   (dimethyl carbonate): 53 parts by weight
Silicon system leveling agent: 0.05 parts by weight
Crosslinkable MS beads (Techpolymer manufactured by SEKISUI PLASTICS CO., LTD., refractive index: 1.515, mean diameter: 5.5 μm, fluctuation coefficient: 7): 12.5 parts by weight <Comparison 1>

The coating material adjusted in Example 1 is used and filtered through a mesh of 20 μm having a roughness which is three or more times as large as the mean diameter. After that, the coating material is dropped onto one surface of a triacetyl cellulose (TAC) film (manufactured by Fuji Photo Film Co., Ltd.) having a thickness of 80 μm and is left for 1 minute. It is confirmed that the fine particles were sedimented and the coating material was separated. Thereafter, the surface is coated with the coating material by using the bar coater. After that, an anti-glare film in which the dried film thickness of the anti-glare layer is equal to 13.9 μm is obtained in a manner similar to Example 1 except that the film temperature is controlled to 60° C.

<Comparison 2>

An anti-glare film in which the dried film thickness of the anti-glare layer is equal to 8.1 μm is obtained in a manner similar to Comparison 1 except that a raw material shown in the following coating material compositions is mixed and the resultant coating material is stirred for 2 hours by the disper, thereafter, the coating material is filtered through the mesh of 20 μm having the roughness which is three or more times as large as the mean diameter, then, the coating material is dropped onto one surface of a triacetyl cellulose (TAC) film (manufactured by Fuji Photo Film Co., Ltd.) having a thickness of 80 μm, and thereafter, the surface is soon coated with the coating material by using the bar coater.

(Coating Material Compositions)
Multifunctional acryl oligomer: 100 parts by weight
Photopolymerization initiator (IRGACURE 184 manufactured by CIBA-GEIGY Co., Ltd.): 3 parts by weight
Solvent (t-butanol): 165 parts by weight
   Crosslinkable styrene beads SBX6 obtained by classifying and removing the particles of 10 μm or more (manufactured by SEKISUI PLASTICS CO., LTD.): 6 parts by weight
A mean diameter of the crosslinkable styrene beads SBX6 is equal to 5.9 μm.

<Comparison 3>

An anti-glare film is obtained in a manner similar to Comparison 2 except that the dried film thickness of the anti-glare layer is set to 9.3 μm.

<Comparison 4>

An anti-glare film is obtained in a manner similar to Comparison 2 except that the dried film thickness of the anti-glare layer is set to 11.1 μm.

<Comparison 5>

An anti-glare film is obtained in a manner similar to Comparison 2 except that the dried film thickness of the anti-glare layer is set to 12.3 μm.

<Comparison 6>

An anti-glare film is obtained in a manner similar to Comparison 2 except that the dried film thickness of the anti-glare layer is set to 15.0 μm.

<Comparison 7>

First, a raw material shown in the following coating material compositions is mixed and the resultant coating material is stirred for 2 hours, thereby obtaining a coating material. Subsequently, the TAC film (manufactured by Fuji Photo Film Co., Ltd.) having a thickness of 80 μm is coated with the resultant coating material by the die coater at a rate of 10 m/min. Subsequently, the coating material is dried for 2 minutes in a drying furnace at 80° C. Thereafter, the film is adjusted to 40° C. and the ultraviolet rays are irradiated at 500 mJ/cm$^2$, thereby forming an anti-glare layer having a dried film thickness of 13.7 μm. In this manner, an optical film of Comparison 7 is obtained.

(Coating Material Compositions)
6-functional urethane acryl oligomer: 80 parts by weight
   Acrylic polymer: 20 parts by weight
Initiator (IRGACURE 184): 5 parts by weight
Solvent (butyl acetate): 65 parts by weight
   (dimethyl carbonate): 53 parts by weight
Silicon system leveling agent: 0.05 parts by weight
Crosslinkable MS beads (Techpolymer manufactured by SEKISUI PLASTICS CO., LTD., refractive index: 1.515, mean diameter: 5.5 μm, fluctuation coefficient: 7): 25 parts by weight The dried film thicknesses of the anti-glare layers in Examples 1 to 7 and Comparisons 1 to 7 are measured by using the Thickness Measuring Instrument (manufactured by TESA Co., Ltd.).

With respect to each of the anti-glare films in Examples 1 to 7 and Comparisons 1 to 7, optical characteristics and an average interval (Sm) of the concave/convex portions are measured by the following methods.

(Evaluation of Diffusion Reflecting Characteristics)

With respect to each of the anti-glare films in Examples 1 to 7 and Comparisons 1 to 7, in order to suppress an influence of the back surface reflection and evaluate the diffusion reflecting characteristics of the anti-glare film itself, the back surface of each of the produced anti-glare films is adhered onto black glass through a pressure sensitive adhesive. A Goniophotometer GP-1-3D manufactured by OPTEC CO., LTD is used, an incident angle of the light source to a sample is set to 5°, the direction of specular reflection is set to 0°, and a reflection intensity is measured every 0.2° in a range of −5° to 30°, thereby obtaining the diffusion reflecting characteristics.

From the result of the obtained diffusion reflecting characteristics, the angle α1 at which the differentiation $d\{Log(I(\alpha))\}/d\alpha$ of the logarithm reflection intensity $Log(I(\alpha))$ indicates the extreme values is obtained. The angle at which the reflection intensity becomes maximum is assumed to be α0 and $Log(I(\alpha0))-Log(I(\alpha1))$ is obtained. The results are shown in Table 1.

(Evaluation of Anti-Glare Property)

With respect to each anti-glare film of Examples 1 to 7 and Comparisons 1 to 7, in order to suppress an influence of a back surface reflection and evaluate the anti-glare property of the anti-glare film itself, the back surface of each of the manufactured anti-glare films is adhered onto black glass through the pressure sensitive adhesive. After that, in a state where two fluorescent lamps are exposed, the fluorescent lamps arranged in parallel are used as a light source and the light is made to enter from the direction of 20°. An image reflected to each anti-glare film is observed by the eyes from the direction of specular reflection. The presence or absence of the reflec tion of the fluorescent lamps is evaluated on the basis of the following criteria. The results are shown in Table 1.
  A: Outlines of the fluorescent lamps are obscure (the two fluorescent lamps are seen like one lamp).
  B: Although the fluorescent lamps can be visually recognized to a certain extent, the outlines are blurred.
  C: The fluorescent lamps are reflected as they are.

Further, in order to evaluate superiority and inferiority of their anti-glare properties by a rank arranging method and suppress an influence of a personal taste, a ranking process is individually executed by three test subjects and a ranking process is performed based on its total value. The ranks obtained in this manner are written in parentheses in a column of the anti-glare property in Table 1. It means that the smaller the rank is, the higher the anti-glare property is.

(Evaluation of Transmitted Image Clarity)

With respect to each of the anti-glare films of Examples 1 to 7 and Comparisons 1 to 7, in order to evaluate the transmission clarity of the image of the fine pitch, the transmitted image clarity is evaluated by using the optical combs having comb widths of 2 mm, 1 mm, 0.5 mm, 0.25 mm, and 0.125 mm in accordance with JIS-K7105. A measuring apparatus used for the evaluation is an Image Clarity Meter (ICM-IT model) manufactured by SUGA TEST INSTRUMENTS CO., LTD.

The value C(2.0) of the comb width of 2 mm and the ratio C(0.125)/C(2.0) of the value C(2.0) of the comb width of 2 mm and the value C(0.125) of the comb width of 0.125 mm are shown in Table 1. On the other hand, the sum of transmitted image clarity measured by using the optical combs having comb widths of 2 mm, 1 mm, 0.5 mm, 0.25 mm, and 0.125 mm is shown as image clarity.

(Measurement of Average Interval Between Concave and Convex Portions)

Figure 15:
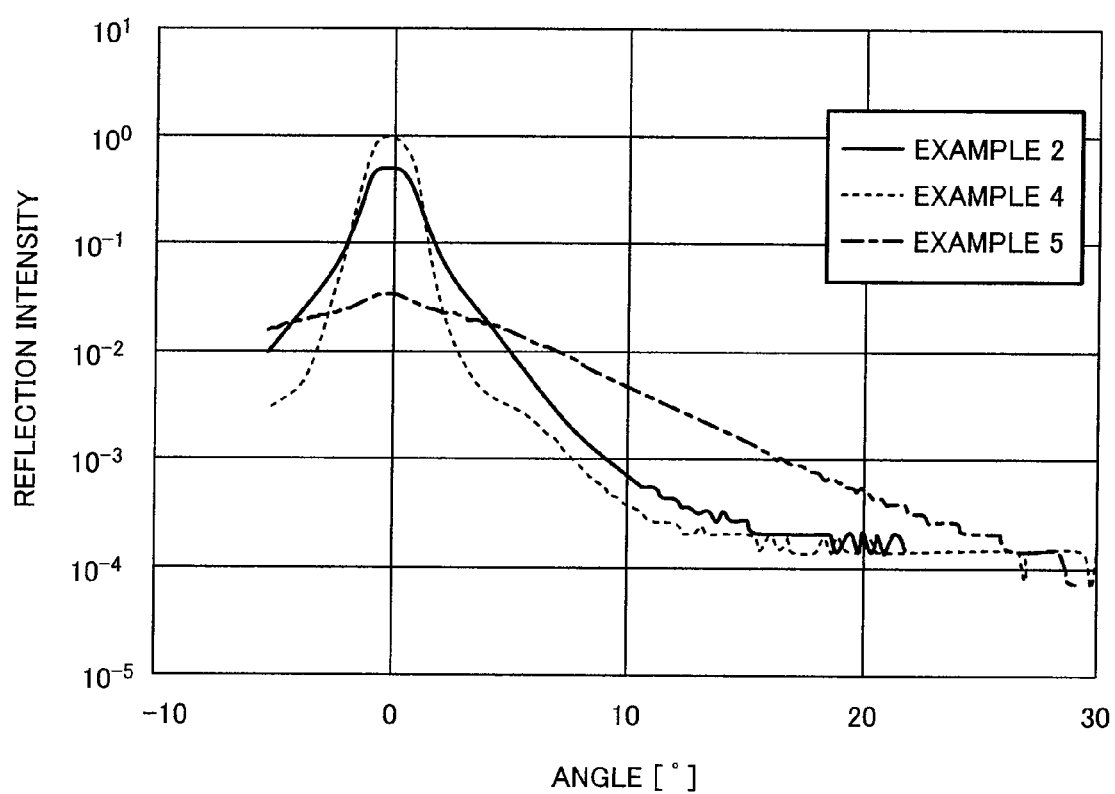
FIG. 15 is a graph showing diffusion reflecting characteristics in Examples 2, 4, and 5.

With respect to each of the anti-glare films of Examples 1 to 7 and Comparisons 1 to 7, a surface roughness is measured according to JIS B0601:2001, roughness curves are obtained from 2-dimensional cross sectional curves, and an average length RSm of outline curve elements is calculated. The results are shown in Table 1. A measuring apparatus and measuring conditions are as follows. RSm corresponds to Sm.
  Measuring apparatus: Automatic Microfigure Measuring Instrument SURFCORDER ET4000A (manufactured by Kosaka Laboratory Ltd.)
  $\lambda c$=0.8 mm, evaluation length=4 mm, cut-off×5 times, data sampling interval=0.5 μm FIG. 15 shows measurement results of the diffusion reflecting characteristics of the anti-glare films in Examples 2, 4, and 5. As shown in FIG. 15, according to the anti-glare films in Examples 2, 4, and 5, characteristics similar to the diffusion reflecting characteristics shown in FIG. 7 are obtained and the angle $\alpha 1$ at which the differentiation $d\{Log(I(\alpha))\}/d\alpha$ of the logarithm reflection intensity $Log(I(\alpha))$ indicates the extreme values can be confirmed.

Figure 16:
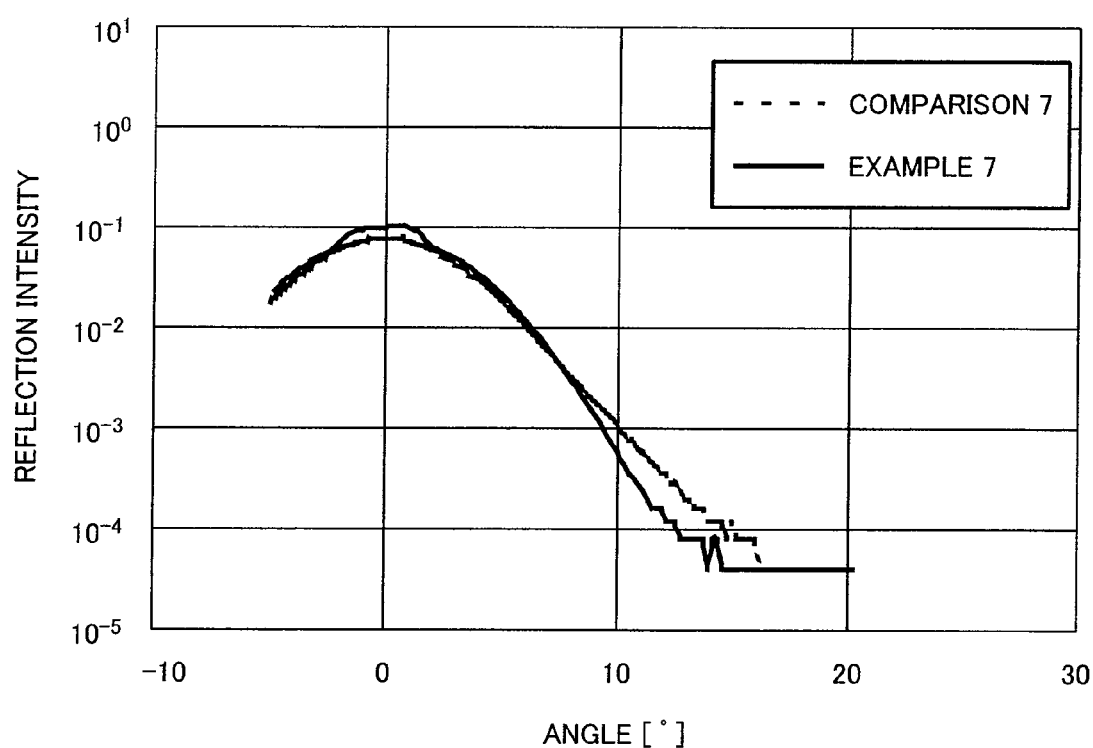
FIG. 16 is a graph showing diffusion reflecting characteristics in Example 7 and Comparison 7.
Figure 17:
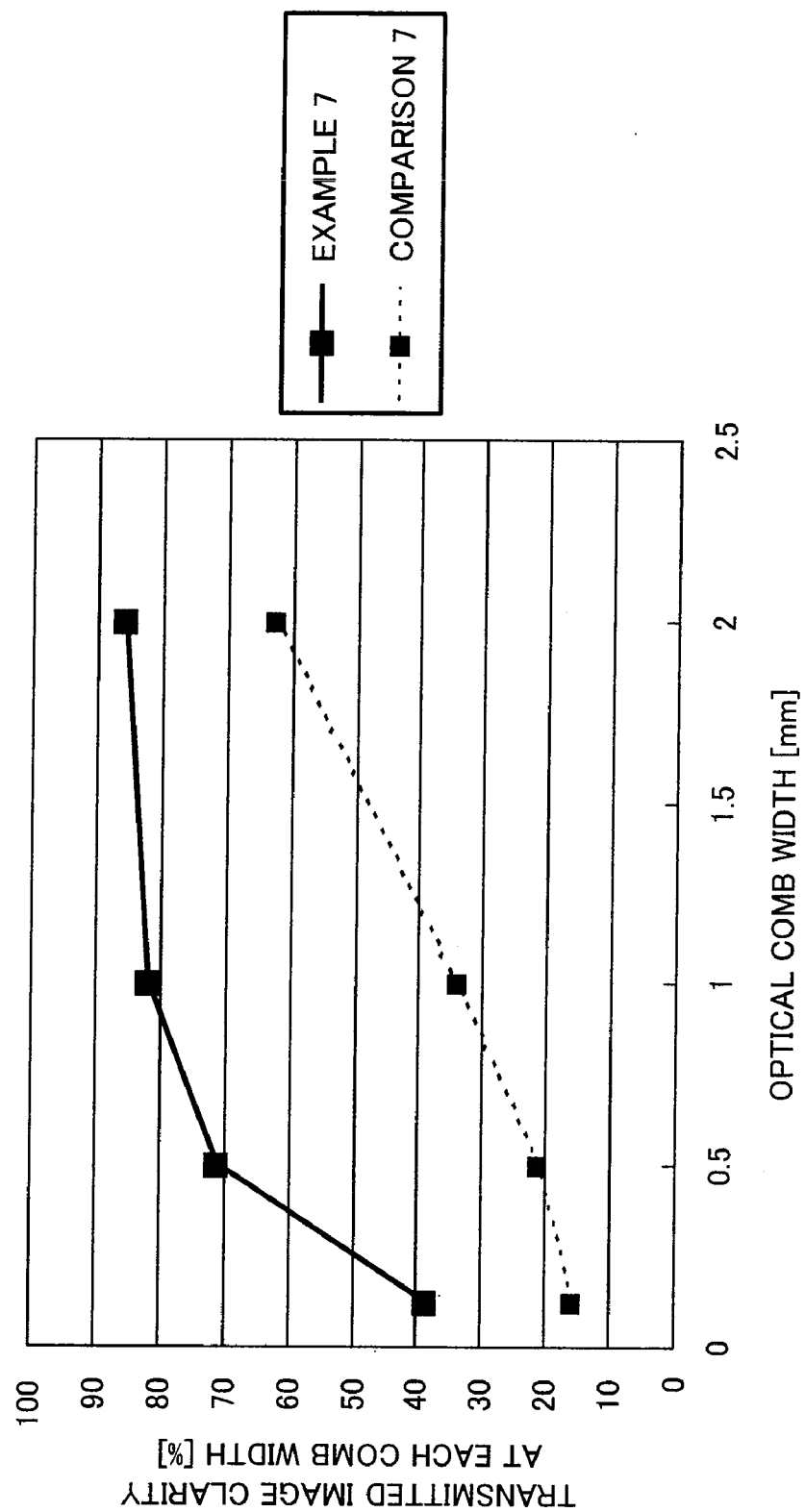
FIG. 17 is a graph showing transmitted image clarity in each comb width in Example 7 and Comparison 7.

FIG. 16 shows measurement results of the diffusion reflecting characteristics in Example 7 and Comparison 7. In Example 7, characteristics similar to the diffusion reflecting characteristics shown in FIG. 7 are shown and the angle $\alpha 1$ at which the differentiation $d\{Log(I(\alpha))\}/d\alpha$ of the logarithm reflection intensity $Log(I(\alpha))$ indicates the extreme values can be confirmed. However, the angle at which the differentiation indicates the extreme values cannot be confirmed in Comparison 7. When comparing those image clarity, as shown in FIG. 17, it will be understood that all of C(2.0), C(0.125)/C(2.0), and the total value of the clarity of each comb in Example 7 are larger than those in Comparison 7 and the high clear optical film can be realized. Although a polymer addition amount when all resin components are equal to 100 parts by weight is equal to 10 parts by weight due to the influence by the difference of the leveling performance of the resin in Example 7, a polymer addition amount is equal to 20 parts by weight in Comparison 7. Since a molecular weight of the polymer is larger than that of monomer or oligomer, the leveling is hard to progress and meniscuses between the particles are liable to be continuously formed, so that the narrow-angle components are difficult to be produced. It is necessary to control the leveling performance by adjusting the resin compositions as mentioned above and to form the anti-glare film so that the narrow-angle components and the wide-angle components exist mixedly. Even in the case of the same resin, since the leveling progresses by controlling the temperature upon hardening to a high temperature, it is important to control the resin compositions and the temperature upon hardening. In the case of controlling the temperature upon hardening to about 30 to 40° C. near the room temperature, the addition amount of the polymer lies within a range, preferably, from 0 part by weight or more to 15 parts by weight or less for the total weight of 100 parts by weight of the resin, much preferably, from 3 parts by weight or more to 10 parts by weight or less. When the addition amount of the polymer is large, since the leveling is difficult to progress, it is necessary to raise the temperature upon hardening.

TABLE 1

|  | ANTI-GLARE PROPERTY | α1 [°] | Log(I(α0)) − Log(I(α1)) | IMAGE CLARITY | C(2.0) [%] | C(0.125)/ C(2.0) | AVERAGE DISTANCE BETWEEN CONCAVE/CONVEX PORTIONS [μm] |
|---|---|---|---|---|---|---|---|
| EXAMPLE 1 | B (7) | 2.4 | 1.2 | 197.9 | 82.3 | 0.18 | 256 |
| EXAMPLE 2 | B (10) | 2.2 | 0.9 | 243.9 | 79.0 | 0.49 | 213 |
| EXAMPLE 3 | A (5) | 1.9 | 0.7 | 135.1 | 60.5 | 0.14 | 146 |
| EXAMPLE 4 | B (11) | 3.8 | 2.5 | 224.6 | 91.0 | 0.29 | 172 |
| EXAMPLE 5 | A (1) | 1.0 | 0.1 | 98.8 | 30.8 | 0.64 | 112 |
| EXAMPLE 6 | B (7) | 1.8 | 0.46 | 214.6 | 65.5 | 0.70 | 175 |
| EXAMPLE 7 | A (4) | 1.9 | 0.22 | 277.6 | 85.9 | 0.45 | 75 |
| COMPARISON 1 | C (13) | 2.6 | 1.1 | 142.5 | 71.9 | 0.01 | 431 |
| COMPARISON 2 | A (3) |  | NONE | 73.9 | 54.4 | 0.01 | 188 |
| COMPARISON 3 | B (6) |  | NONE | 107.6 | 67.1 | 0.02 | 242 |
| COMPARISON 4 | B (7) |  | NONE | 157.2 | 76.3 | 0.04 | 215 |
| COMPARISON 5 | B (11) |  | NONE | 185.5 | 79.8 | 0.09 | 186 |
| COMPARISON 6 | C (14) |  | NONE | 213.5 | 80.2 | 0.30 | 174 |
| COMPARISON 7 | A (2) |  | NONE | 133.6 | 62.5 | 0.25 | 164 |

Figure 18:
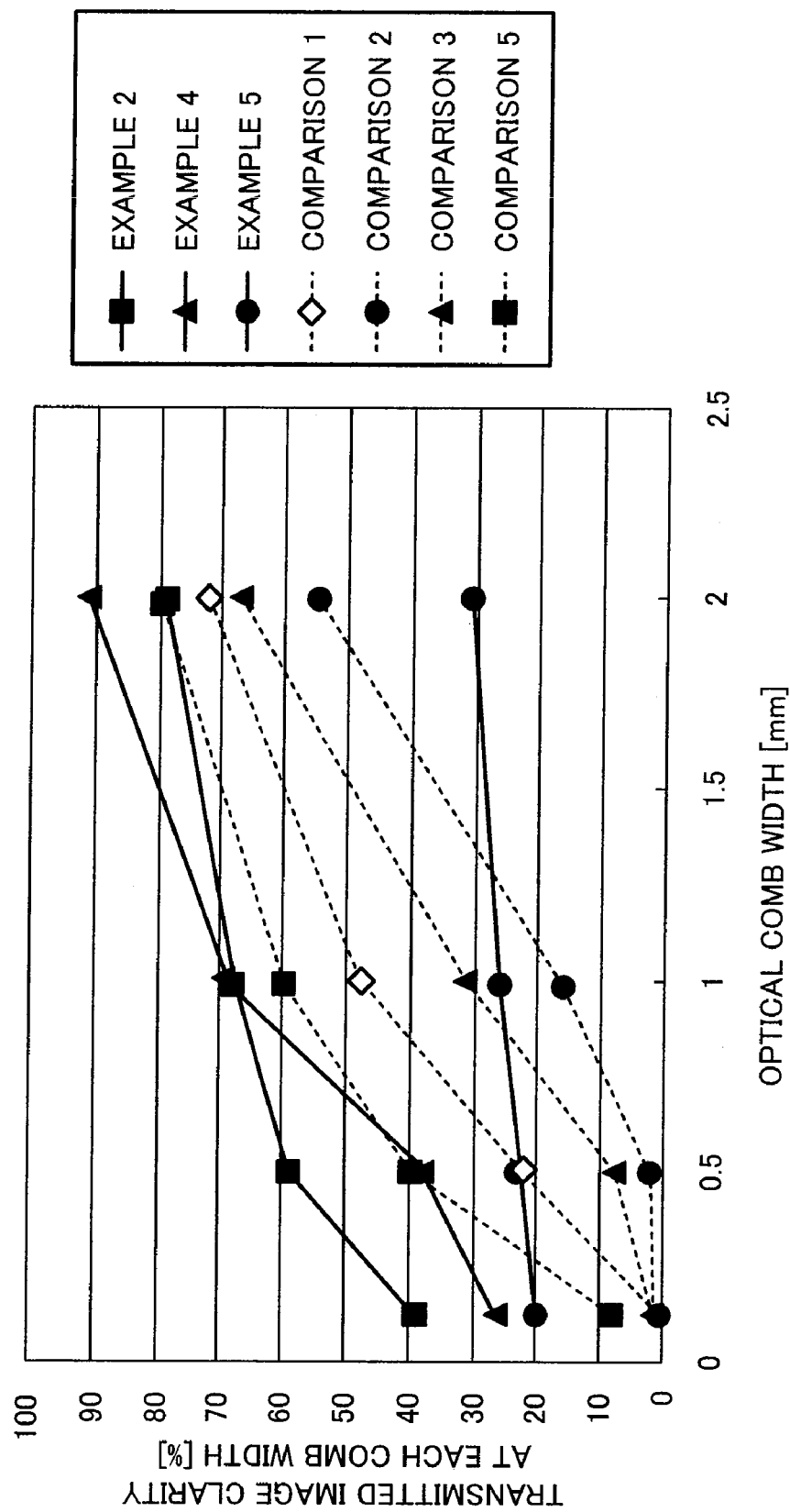
FIG. 18 is a graph showing transmitted image clarity in each comb width in Examples 1 to 5 and Comparisons 1 to 5.

FIG. 18 shows measurement results of the transmitted image clarity of the anti-glare films in Examples 2 to 5 and Comparisons 1 to 5. As shown in FIG. 18, it will be understood that in Examples 2 to 5, even if the comb widths are narrow, the transmitted image clarity does not change largely as compared with Comparisons 1 to 5.

The following points will be understood from Table 1.

According to the anti-glare films in Examples 1 to 5, each film has the angle α1 and the diffusion reflecting characteristics are characteristics in which the reflection components of the narrow angle and the diffusion reflection components of the wide angle exist mixedly, and both of the anti-glare property and the transmitted image clarity can be satisfied. On the other hand, according to the anti-glare films in Comparisons 2 to 6, characteristics similar to the diffusion reflecting characteristics shown in FIG. 5 are obtained and the diffusion reflecting characteristics in which the reflection components of the narrow angle and the diffusion reflection components of the wide angle exist mixedly are not obtained. According to the anti-glare film shown in Comparison 1, although diffusion reflecting characteristics similar to those in Example 1 are obtained, when this anti-glare film is actually applied to the surface of the image display apparatus and an image is observed, the reflection edges are visually recognized and the anti-glare property is felt low. It is considered that this is because since the average distance between the concave and convex portions is larger than 300 μm, even if the film is seen at a remote place, the specular reflection light in a flat shape is felt strong.

When a fine image of a fine pitch is displayed and this image is observed, now comparing, for example, Example 4 and Comparison 5 whose anti-glare properties are considered to be almost equal, obviously, a contrast in Example 4 is higher and a higher clear image is obtained. When comparing Example 2 and Comparison 5, in spite of a fact that the anti-glare property to the external light in Example 2 is felt high, the image itself is clearly seen at a high contrast.

According to the anti-glare films shown in Comparisons 1 to 5, the ratio C(0.125)/C(2.0) of the transmitted image clarity is so small to be 0.1 or less. However, according to the anti-glare films shown in Examples 1 to 5, such a value is equal to 0.1 or more and there is a film whose ratio is so high to be equal to 0.6 or more. In Comparison 6, the ratio C(0.125)/C(2.0) of the transmitted image clarity is so high to be 0.3. However, it has been found that if the diffusion reflecting characteristics is reduced to such a value by the technique of the conventional anti-glare film, the anti-glare property can be hardly obtained and the edges of the reflection image are visually recognized. When those anti-glare films are actually applied to the image display apparatus and the fine images are observed, for example, when comparing Example 3 and Comparison 4, although the anti-glare property to the external light in Example 3 is felt high, the contrast of the image itself is also highly clearly seen. The value C(2.0) of the comb width of 2 mm in Example 3 is equal to 60.5 and the value C(2.0) of the comb width of 2 mm in Comparison 4 is equal to 76.3. Although the contrast in the case of the wide comb width of about 2 mm in Comparison 4, is high, when the image of a similar degree of fineness feeling is observed, the contrast in Example 3 is felt high. As mentioned above, it has been found that not only the value C(2.0) of the comb width of 2 mm but also the value of the ratio C(0.125)/C(2.0) of the transmitted image clarity is important.

From the above results, it has been found that the diffusion reflecting characteristics show the characteristics in which the reflection components of the narrow angle and the diffusion reflection components of the wide angle exist mixedly, and by forming the anti-glare film in which the average interval between the micro concave and convex portions on the surface is equal to 300 μm or less, both of the transmitted image clarity and the anti-glare property can be satisfied. It has been also found that by setting the value C(2.0) of the comb width of 2 mm of the anti-glare film to 30% or more and by setting the ratio C(0.125)/C(2.0) of the transmitted image clarity to 0.1 or more, both of the transmitted image clarity and the anti-glare property can be satisfied.

Examples 6 to 30

In Example 1, by adjusting the film temperature upon hardening to 40° C., the resin shape between the particles is properly leveled, thereby controlling the ratio of narrow-angle reflecting portions and wide-angle diffusion reflecting portions of the anti-glare layer surface, so that the anti-glare films in which the angles α1 are different are obtained.

With respect to each of the anti-glare films in Examples 6 to 30, the reflection is evaluated by a method similar to the evaluation of the anti-glare property performed in Example 1. The presence or absence of the reflection is evaluated on the basis of the following reference.
  ○: A fluorescent lamp is seen to be blurred and the reflection is not worried about.
  ×: An outline of the fluorescent lamp is clearly seen and the reflection is worried about.

Figure 19:
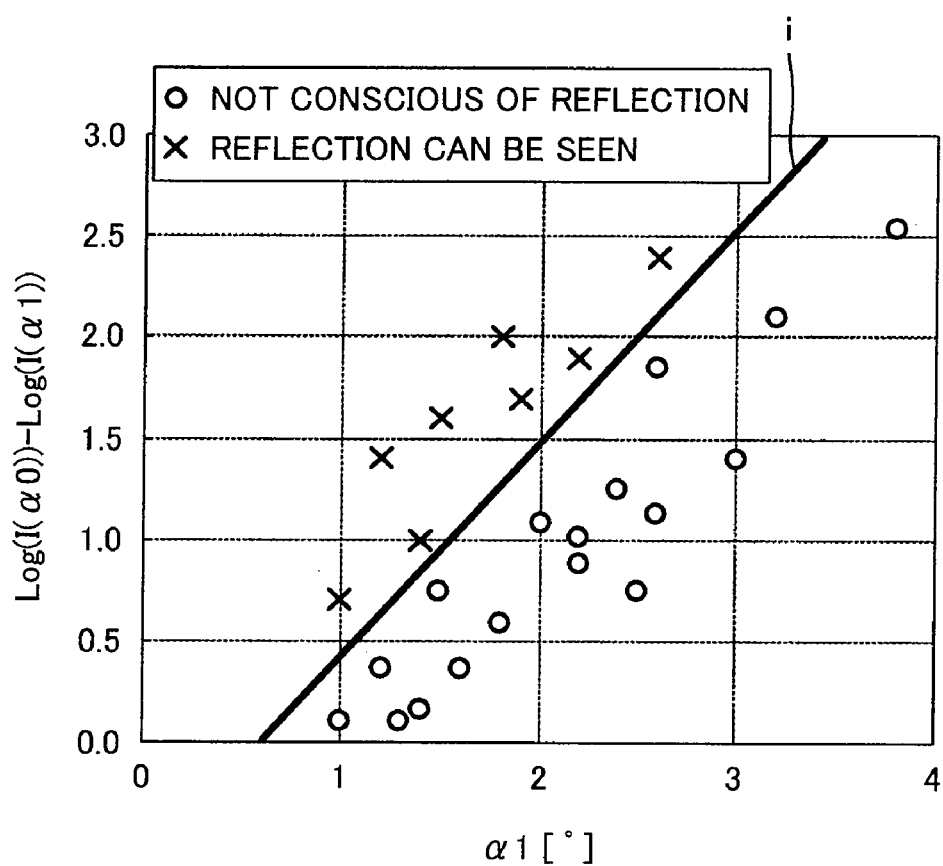
FIG. 19 is a graph showing a result of a reflection evaluation of each anti-glare film in Examples 6 to 30.

FIG. 19 is a graph showing a result of a reflection evaluation of each anti-glare film in Examples 6 to 30, in which an axis of abscissa indicates the angle α1 and an axis of ordinate indicates the logarithm intensity difference $\text{Log}(I(\alpha 0))-\text{Log}(I(\alpha 1))$. In FIG. 19, a mark "○" in the diagram shows the film in which the reflection is not worried about and a mark "×" in the diagram shows the film in which the reflection is seen. As shown in FIG. 19, the mark "○" and the mark "×" can be classified by a straight line i.

From the above results, it has been found that according to the film in which the deviation angle α and the logarithm intensity difference $\text{Log}(I(\alpha 0))-\text{Log}(I(\alpha 1))$ satisfy the relation of the following equation (1), the reflection on the anti-glare film can be further reduced.

$$\text{Log}(I(\alpha 0))-\text{Log}(I(\alpha 1))=kI\alpha\{(\alpha 1-\alpha 0)-0.5\} (k: 0<kI\alpha \leq 1) \quad \text{(Equation 1)}$$

Although the embodiments and Examples of the embodiments have specifically been described above, the embodiments are not limited to the foregoing embodiments and Examples but various modifications based on the technical idea of the embodiments are possible.

For example, the numerical values mentioned in the foregoing embodiments and Examples are only examples and numerical values different from them may be used as necessary.

Although the above embodiment has been described with respect to the example in which the present application has been applied to the liquid crystal display apparatus, the present application is not limited to it. For example, the present application can be applied to various display apparatuses such as plasma display, organic EL display, inorganic EL display, CRT display, rear projection display, surface conduction electron-emitting device display, FED (Field Emission Display), LED display, and rear projection display (laser TV) using a laser as a light source.

On the other hand, although the above second embodiment has been described with respect to the example in which the target to be processed is processed and the mother plate is produced by using the mask imaging method using the KrF excimer laser, a method whereby a desired surface shape is obtained may be used and the producing method of the mother plate is not limited to such an example. For instance, the mother plate may be produced by a pressing method, a method using stamper for molding, a cutting method, or a blasting method.

In the foregoing embodiment, on the other hand, an anti-glare film having a plurality of layers by providing a low refractive index layer having a refractive index smaller than that of the anti-glare layer 12 or the like onto the anti-glare layer 12, or the like may be used. As a material forming the low refractive index layer, for example, a photosensitive resin or the like containing fluorine (F) can be used.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An optical film comprising:
a layer including micro concave/convex portions formed on a surface of the layer,
wherein an average horizontal interval between minimum depths of the micro concave portions and maximum heights of the convex portions ranges from 5 to 300 μm, and
wherein when light incident on the layer is reflected in a direction of specular reflection there is a deviation angle $\alpha$ from the direction of specular reflection at which a differentiation with respect to $d\{\mathrm{Log}(I(\alpha))\}/d\alpha$ is at a maximum absolute value, where $\mathrm{Log}(I(\alpha))$ represents a logarithm of an intensity of light reflected at the deviation angle $\alpha$.

2. The optical film according to claim 1, wherein when an angle showing the maximum absolute value of the differentiation with respect to angle $d\{\mathrm{Log}(I(\alpha))\}/d\alpha$ of the logarithm intensity of reflection $\mathrm{Log}(I(\alpha))$ in the direction of said deviation angle $\alpha$ is assumed to be $\alpha 1$ and an angle showing a maximum reflection intensity of said logarithm intensity of reflection $\mathrm{Log}(I(\alpha))$ is assumed to be $\alpha 0$, a relation of the following equation (1) is satisfied:

$$\mathrm{Log}(I(\alpha 0))-\mathrm{Log}(I(\alpha 1))=kI\alpha\{(\alpha 1 - \alpha 0)-0.5\} (k: 0<kI\alpha 1) \quad \text{(Equation 1)}.$$

3. The optical film according to claim 1, wherein an angle $\alpha 1$ showing the maximum absolute value of the differentiation with respect to angle $d\{\mathrm{Log}(I(\alpha))\}/d\alpha$ of the logarithm intensity of reflection $\mathrm{Log}(I(\alpha))$ in the direction of said deviation angle $\alpha$ is equal to 6° or less.

4. The optical film according to claim 1, wherein an angle $\alpha 0$ showing a maximum value of the logarithm intensity of reflection $\mathrm{Log}(I(\alpha))$ in the direction of said deviation angle $\alpha$ is equal to 0°.

5. The optical film according to claim 1, wherein said optical film further comprising
a substrate, and
the layer is an anti-glare layer and is provided on said substrate, and
said anti-glare layer contains fine particles and said micro concave/convex portions are formed on the surface by said fine particles.

6. The optical film according to claim 1, wherein said micro concave/convex portions are obtained by coating said substrate with a coating material containing fine particles and a resin, aggregating said fine particles by a convection of said coating material, and hardening said coating material.

7. The optical film according to claim 1, wherein an average particle size of said fine particles lies within a range from 1.5 μm or more to 7.5 μm or less, and
an average film thickness of the layer lies within a range from 4 μm or more to 15 μm or less.

8. An optical film comprising:
a layer including micro concave/convex portions formed on a surface of the layer,
wherein an average horizontal interval between minimum depths of the micro concave portions and maximum heights of the convex portions ranges from 5 to 300 μm, and
a differentiation $d\{P(\beta)\}/d\beta$ of a histogram $P(\beta)$ to an inclination angle $\beta$ of said micro concave/convex portions has a maximum absolute value.

9. The optical film according to claim 8, wherein when an angle showing the maximum absolute value of a differentiation with respect to angle $d\{\mathrm{Log}(P(\beta))\}/d\beta$ of a logarithm histogram $\mathrm{Log}(P((\beta))$ to said inclination angle $\beta$ is assumed to be $\beta 1$ and an angle showing a maximum frequency of said logarithm histogram $\mathrm{Log}(P(\beta))$ is assumed to be $\beta 0$, a relation of the following equation (2) is satisfied:

$$\mathrm{Log}(P(\beta 0))-\mathrm{Log}(P(\beta 1))=kP\beta\{(\beta 1-\beta 0)-0.5\}(k: 0<kP\beta \leq 1) \quad \text{(Equation 2)}.$$

10. The optical film according to claim 5, wherein an angle $\beta 1$ showing the maximum absolute value of a differentiation $d\{P(\beta)\}/d\beta$ of a histogram $P(\beta)$ to said inclination angle $\beta$ is equal to 3° or less.

11. The optical film according to claim 8, wherein an angle $\beta 0$ at which a histogram $P(\beta)$ to said inclination angle $\beta$ shows a maximum frequency is equal to 0°.

12. The optical film according to claim 8, wherein
a value $C(2.0)$ of transmitted image clarity measured by using an optical comb having a comb width of 2 mm in accordance with JIS-K7105 is equal to 30% or more, and
a ratio $C(0.125)/C(2.0)$ of the value $C(2.0)$ measured by using said optical comb having the comb width of 2 mm and a value $C(0.125)$ measured by using an optical comb having a comb width of 0.125 mm is equal to 0.1 or more.

13. An optical film comprising:
a layer including micro concave/convex portions formed on a surface of the layer,
wherein an average horizontal interval between minimum depths of the micro concave portions and maximum heights of the convex portions ranges from 5 to 300 μm,
a value $C(2.0)$ of transmitted image clarity measured by using an optical comb having a comb width of 2 mm in accordance with JIS-K7105 is equal to 30% or more, and
a ratio $C(0.125)/C(2.0)$ of the value $C(2.0)$ measured by using said optical comb having the comb width of 2 mm and a value $C(0.125)$ measured by using an optical comb having a comb width of 0.125 mm is equal to 0.1 or more.

14. A method of manufacturing an optical film, the method comprising:
forming a layer including micro concave/convex portions on a surface of the layer, and forming said micro concave/convex portions by a shape transfer method, a sand blasting method, or a method of coating with a coating material containing a resin and fine particles, wherein an average horizontal interval between minimum depths of the micro concave portions and maximum heights of the convex portions ranges from 5 to 300 µm, and wherein when light incident on the layer is reflected in a direction of specular reflection there is a deviation angle α from the direction of specular reflection at which a differentiation with respect to $d\{Log(I(\alpha))\}/d\alpha$ is at a maximum absolute value, where $Log(I(\alpha))$ represents a logarithm of an intensity of light reflected at the deviation angle α.

15. The method of manufacturing the optical film according to claim 14, wherein the forming step of said micro concave and convex portions includes:

supplying a resin containing an ionizing radiation-curable resin or a thermosetting resin into a die; and hardening and exfoliating the resin supplied to said die.

16. The method of manufacturing the optical film according to claim 14, wherein said forming step of said micro concave and convex portions includes:

coating a substrate with the coating material containing an ionizing radiation-curable resin or a thermosetting resin as a resin and the fine particles; and drying and hardening said coating material coated onto said substrate, and in the step of hardening said coating material, a temperature of said substrate coated with said coating material is adjusted.

17. The method of manufacturing the optical film according to claim 14, wherein said forming step of said micro concave and convex portions includes:

coating a substrate with the coating material containing an ionizing radiation-curable resin or a thermosetting resin as a resin and the fine particles; and drying and hardening said coating material coated onto said substrate, and a specific gravity difference between said fine particles and liquid components contained in said coating material is adjusted, a proper sedimentation and/or aggregation of said fine particles is caused, and thereafter, said substrate is coated with said coating material.

18. The manufacturing method of the optical film according to claim 14, wherein said forming step of said micro concave and convex portions includes:

coating a substrate with the coating material containing an ionizing radiation-curable resin or a thermosetting resin as a resin and the fine particles; and drying and hardening said coating material coated onto said substrate, and a surface tension difference between said fine particles and said resin in said coating material is adjusted.

19. A method of manufacturing an optical film, the method comprising:

forming a layer including micro concave/convex portions on a surface of the layer, and forming said micro concave/convex portions by a shape transfer method, a sand blasting method, or a method of coating the surface with a resin containing fine particles, wherein an average horizontal interval between minimum depths of the micro concave portion and maximum heights of the convex portions is equal ranges from 5 to 300 µm, and a differentiation $d\{P(\beta)\}/d\beta$ of a histogram $P(\beta)$ to an inclination angle β of said micro concave/convex portions has a maximum absolute value.

20. A method of manufacturing an optical film, the method comprising:

forming a layer including micro concave/convex portions on a surface of the layer, and forming said micro concave/convex portions by a shape transfer method, a sand blasting method, or a method of coating the surface with a resin containing fine particles, wherein an average horizontal interval between minimum depths of the micro concave portions and maximum heights of the convex portions ranges from 5 to 300 µm, and a value C(2.0) of transmitted image clarity measured by using an optical comb having a comb width of 2 mm in accordance with JIS-K7105 is equal to 30% or more, and a ratio C(0.125)/C(2.0) of the value C(2.0) measured by using said optical comb having the comb width of 2 mm and a value C(0.125) measured by using an optical comb having a comb width of 0.125 mm is equal to 0.1 or more.

21. An anti-glare polarizer comprising:

a polarizer; and an optical film formed on said polarizer, wherein said optical film has micro concave/convex portions on a surface of the optical film, wherein an average horizontal interval between minimum depths of the micro concave portions and maximum heights of the convex portions ranges from 5 to 300 µm, and wherein when light incident on the optical film is reflected in a direction of specular reflection there is a deviation angle α from the direction of specular reflection at which a differentiation with respect to $d\{Log(I(\alpha))\}/d\alpha$ is at a maximum absolute value, where $Log(I(\alpha))$ represents a logarithm of an intensity of light reflected at the deviation angle α.

22. An anti-glare polarizer comprising a polarizer; and an optical film formed on said polarizer, wherein said optical film has micro concave/convex portions on a surface of the optical film, wherein an average horizontal interval between minimum depths of the micro concave portions and maximum heights of the convex portions ranges from 5 to 300 µm, and a differentiation $d\{P(\beta)\}/d\beta$ of a histogram $P(\beta)$ to an inclination angle β of said micro concave/convex portions has a maximum absolute value.

23. An anti-glare polarizer comprising:

a polarizer; and an optical film formed on said polarizer, wherein said optical film has micro concave/convex portions on a surface of the optical film, wherein an average horizontal interval between minimum depths of the micro concave portions and maximum heights of the convex portions ranges from 5 to 300 µm, and wherein a value C(2.0) of transmitted image clarity measured by using an optical comb having a comb width of 2 mm in accordance with JIS-K7105 is equal to 30% or more, and wherein a ratio C(0.125)/C(2.0) of the value C(2.0) measured by using said optical comb having the comb width of 2 mm and a value C(0.125) measured by using an optical comb having a comb width of 0.125 mm is equal to 0.1 or more.

24. A display apparatus comprising:
a display unit displaying an image; and
an optical film formed on a display surface side of said display unit,
wherein said optical film has micro concave/convex portions on a surface of the optical film,
wherein an average horizontal interval between minimum depths of the micro concave portions and maximum heights of the convex portions ranges from 5 to 300 μm, and
wherein when light incident on the optical film is reflected in a direction of specular reflection there is a deviation angle $\alpha$ from the direction of specular reflection at which a differentiation with respect to $d\{Log(I(\alpha))\}/d\alpha$ is at a maximum absolute value, where $Log(I(\alpha))$ represents a logarithm of an intensity of light reflected at the deviation angle $\alpha$.

25. A display apparatus comprising:
a display unit configured to display an image; and
an optical film formed on a display surface side of said display unit,
wherein said optical film has micro concave/convex portions on a surface of the optical film,
wherein an average horizontal interval between minimum depths of the micro concave portions and maximum heights of the convex portions ranges from 5 to 300 μm, and
wherein a differentiation $d\{P(\beta)\}/d\beta$ of a histogram $P(\beta)$ to an inclination angle $\beta$ of said micro concave/convex portions has an extreme value.

26. A display apparatus comprising:
a display unit configured to display an image; and
an optical film formed on a display surface side of said display unit,
wherein said optical film has micro concave/convex portions on a surface of the optical film,
wherein an average horizontal interval between minimum depths of the micro concave portions and maximum heights of the convex portions ranges from 5 to 300 μtm, and
wherein a value C(2.0) of transmitted image clarity measured by using an optical comb having a comb width of 2 mm in accordance with JIS-K7105 is equal to 30% or more, and
wherein a ratio C(0.125)/C(2.0) of the value C(2.0) measured by using said optical comb having the comb width of 2 mm and a value C(0.125) measured by using an optical comb having a comb width of 0.125 mm is equal to 0.1 or more.

* * * * *